United States Patent
Tashiro

(10) Patent No.: US 9,042,031 B2
(45) Date of Patent: May 26, 2015

(54) ZOOM LENS AND IMAGE PICKUP APPARATUS HAVING THE SAME

(71) Applicant: CANON KABUSHIKI KAISHA, Tokyo (JP)

(72) Inventor: Yoshihisa Tashiro, Nikko (JP)

(73) Assignee: Canon Kabushiki Kaisha, Tokyo (JP)

(*) Notice: Subject to any disclaimer, the term of this patent is extended or adjusted under 35 U.S.C. 154(b) by 88 days.

(21) Appl. No.: 14/010,284

(22) Filed: Aug. 26, 2013

(65) Prior Publication Data
US 2014/0063613 A1    Mar. 6, 2014

(30) Foreign Application Priority Data
Aug. 29, 2012 (JP) .................... 2012-188586

(51) Int. Cl.
  *G02B 15/14* (2006.01)
  *G02B 15/173* (2006.01)

(52) U.S. Cl.
  CPC ............. *G02B 15/14* (2013.01); *G02B 15/173* (2013.01)

(58) Field of Classification Search
  USPC ........................................................ 359/687
  See application file for complete search history.

(56) References Cited

U.S. PATENT DOCUMENTS 7,382,548 B2   6/2008   Kohno et al.
2002/0136150 A1*  9/2002   Mihara et al. ................. 369/125

FOREIGN PATENT DOCUMENTS

JP    2007279541 A    10/2007

* cited by examiner

*Primary Examiner* — James Jones
(74) *Attorney, Agent, or Firm* — Canon USA Inc. IP Division

(57) ABSTRACT

A zoom lens includes, in order from an object side to an image side, a first lens unit having positive refractive power, a second lens unit having negative refractive power, a reflecting unit for bending an optical path, and a rear lens group including two or more lens units, wherein, during zooming, the first and second lens units are moved and the reflecting unit is not moved, and wherein an amount of movement of the first lens unit during zooming from a wide-angle end to a telephoto end, a distance on an optical axis from a reflecting surface of the reflecting unit to an image plane, a distance on the optical axis from a lens surface of the second lens unit closest to the image side to the reflection surface of the reflecting unit at the wide-angle end, and a focal length of the second lens unit are appropriately set.

14 Claims, 23 Drawing Sheets

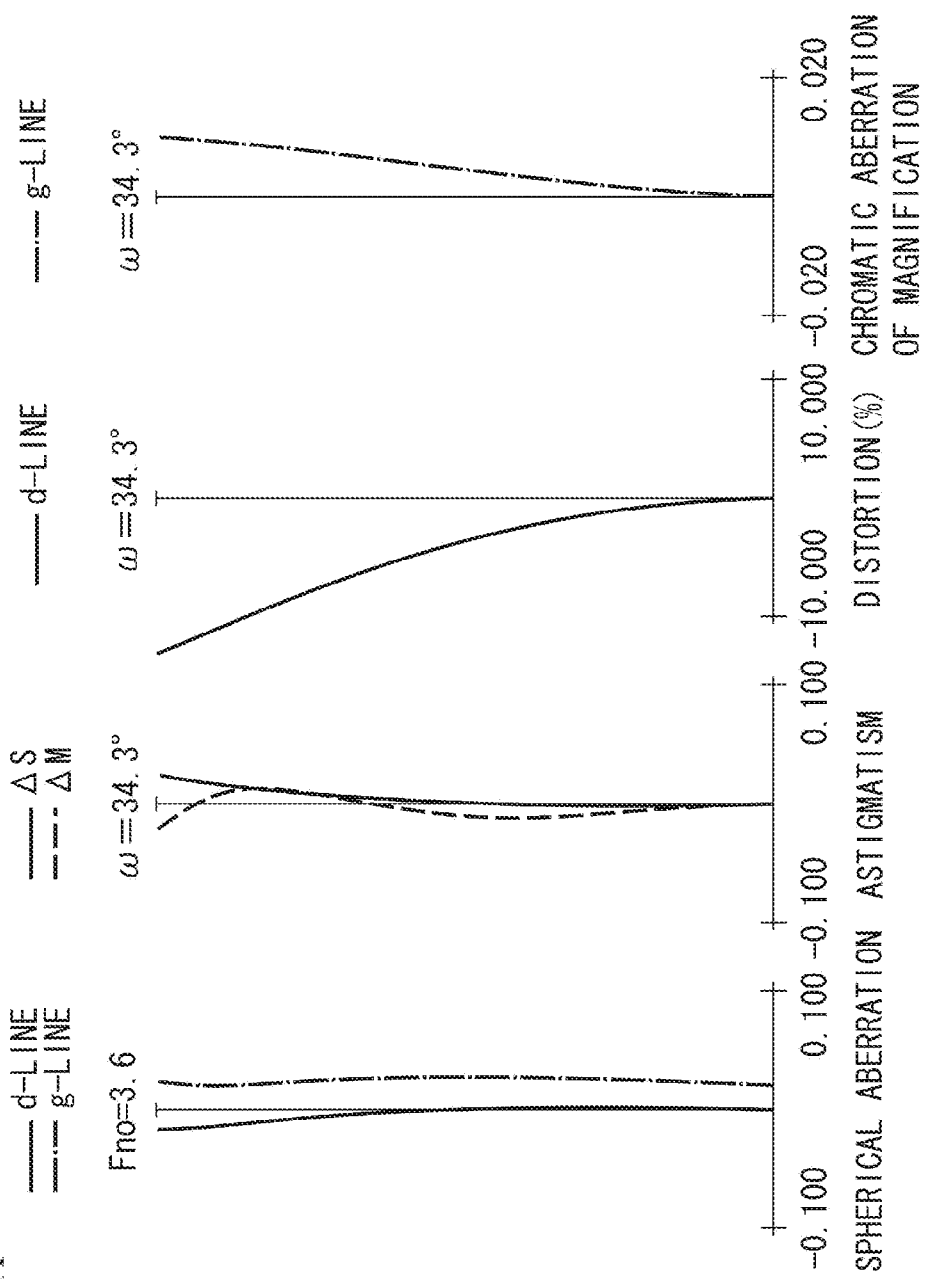

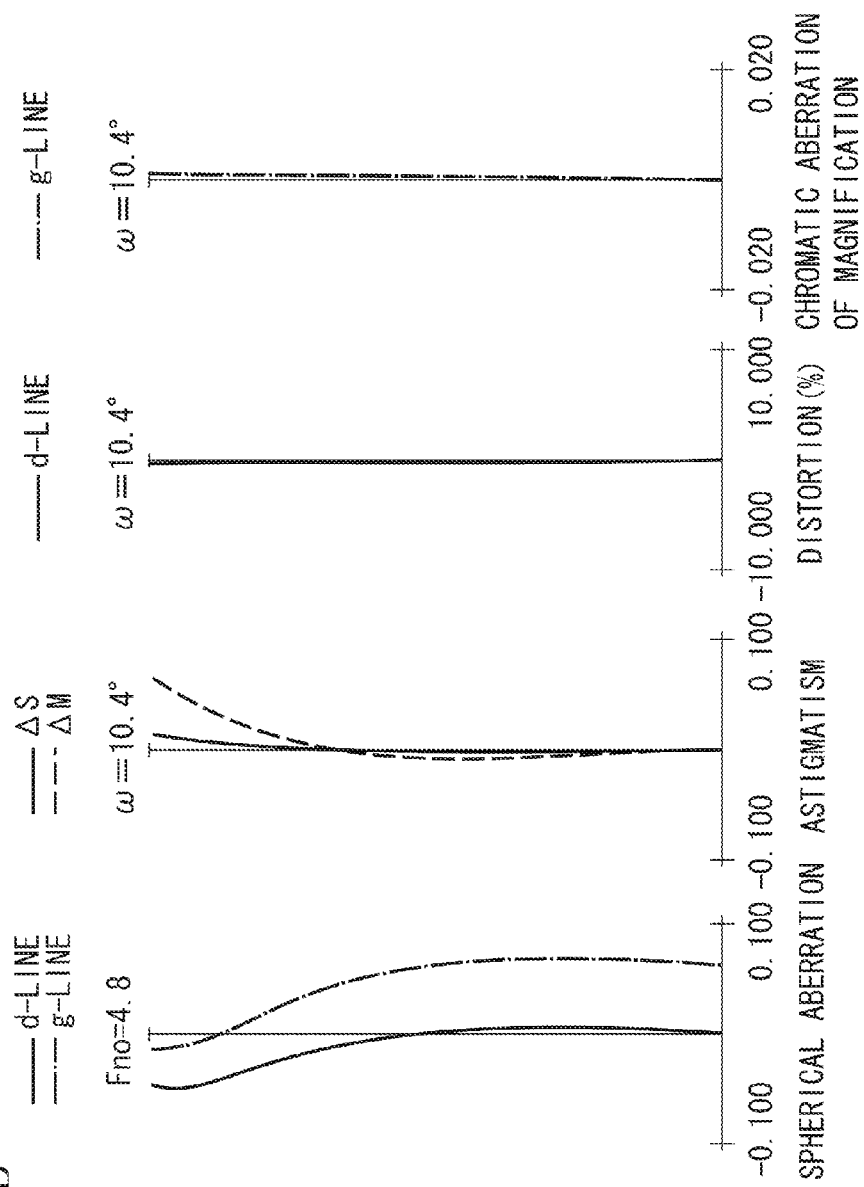

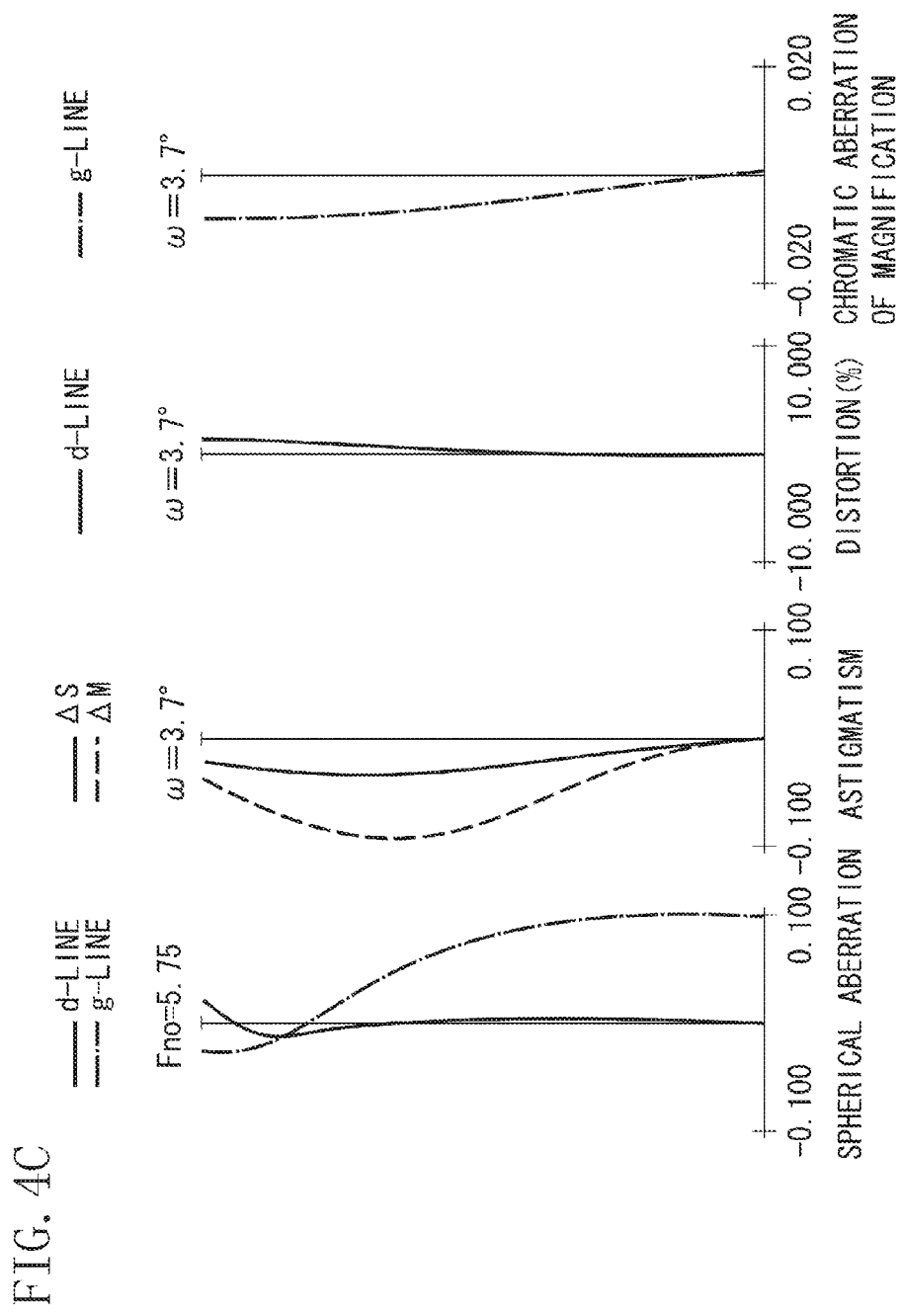

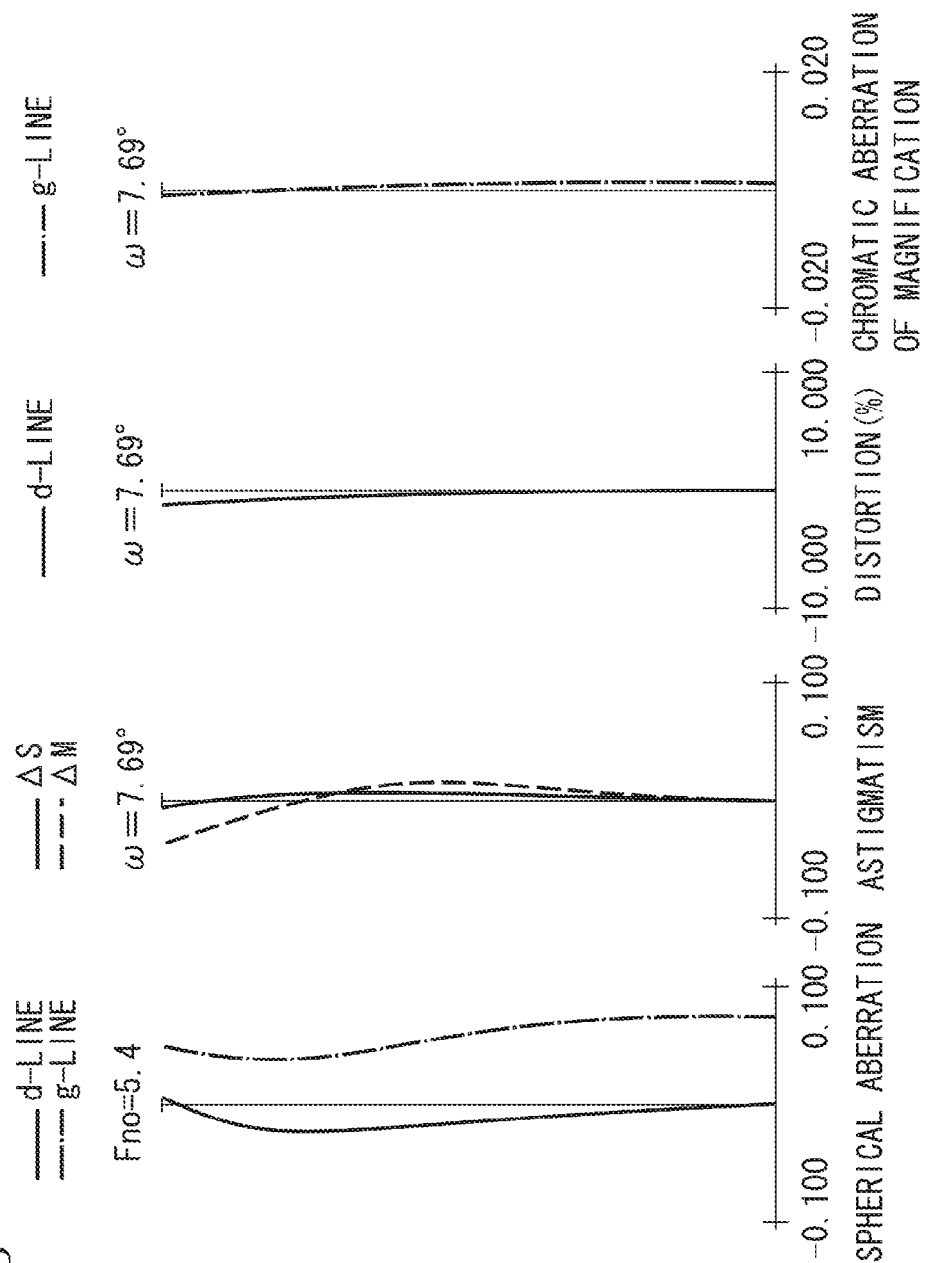

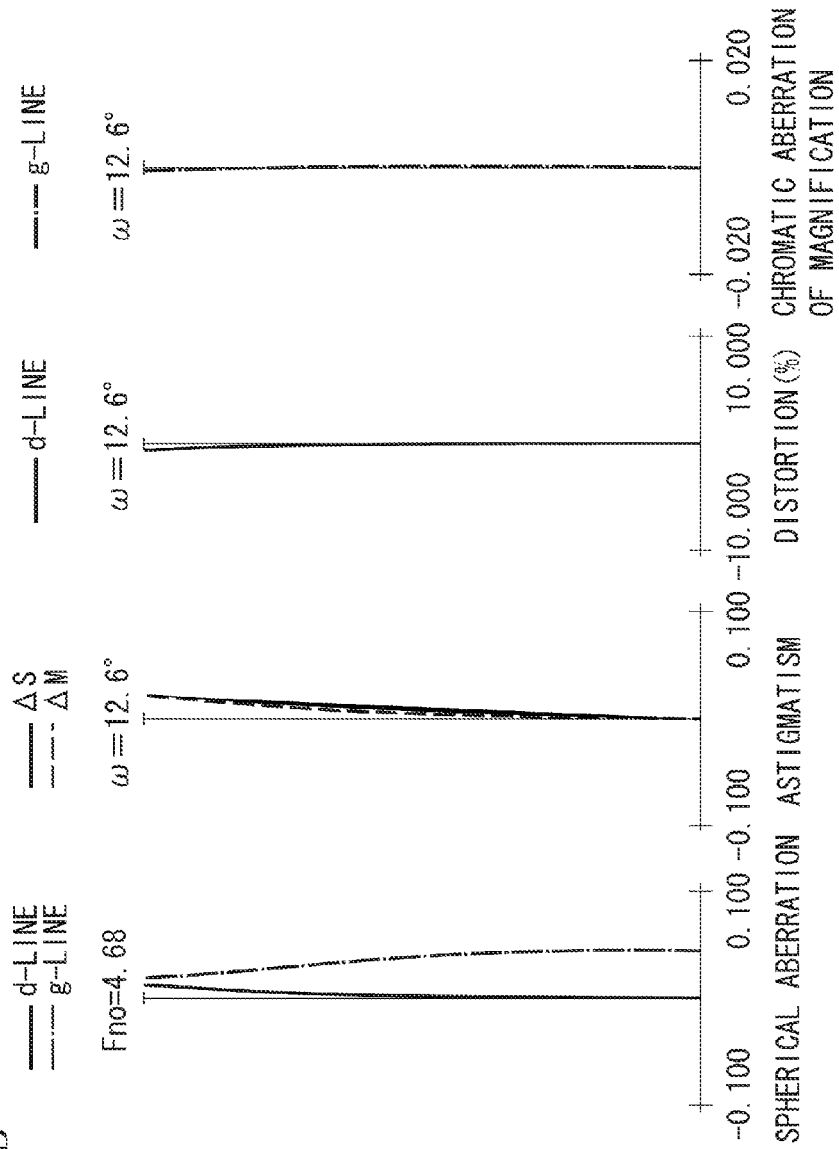

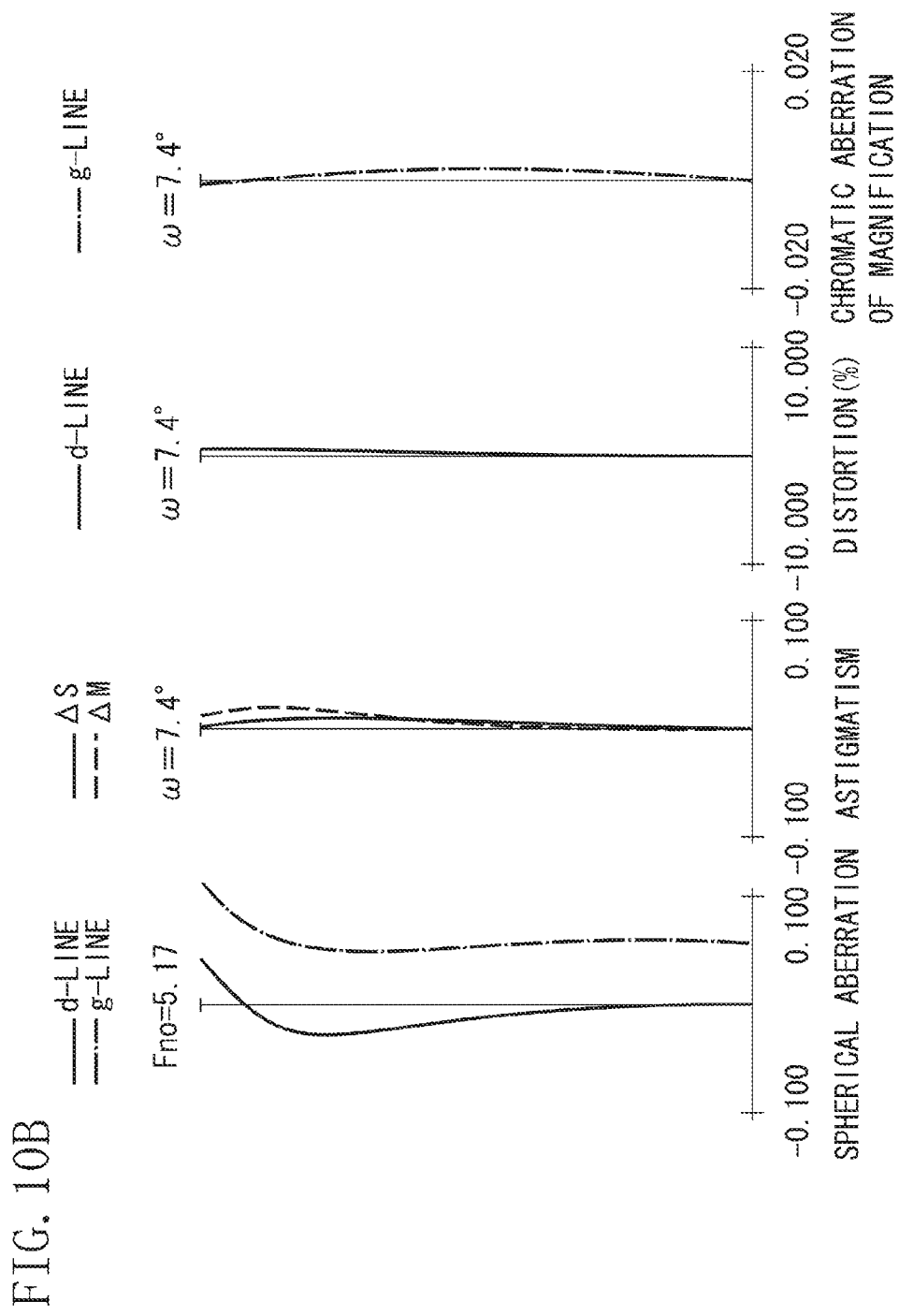

ZOOM LENS AND IMAGE PICKUP APPARATUS HAVING THE SAME

BACKGROUND OF THE INVENTION

1. Field of the Invention

The present invention relates to a zoom lens, which may be suitable for a photographic optical system used in an image pickup apparatus, such as a video camera, a digital still camera, a broadcasting camera, and a silver-halide photography camera.

2. Description of the Related Art

A zoom lens used as a photographic optical system for an image pickup apparatus is required to have a wide angle of view, a high zoom ratio, and compactness in the entire system, so that a thin camera may be achieved. To realize downsizing of the camera while achieving a high zoom ratio of the zoom lens, a retractable zoom lens is known. In a conventional retractable zoom lens, a distance between lens units in a state when not capturing an image is reduced to a distance different from that in an image-capturing state. This allows the lens units to be stored in a housing of the camera when not capturing an image.

Further, to reduce the thickness of the camera, a bending type zoom lens is known. In a bending-type zoom lens, a reflecting unit (reflecting element) for bending an optical path, such as a reflection mirror and a reflection prism that bend an optical axis of a photographic optical system by 90°, is arranged in the optical path. Further, a retractable and optical-path-bending zoom lens is known, in which a lens unit positioned at an object side of the reflecting unit is stored in a space formed by movement of the reflecting unit in a retracted manner.

If the retractable and optical-path-bending zoom lens is used, a high zoom ratio and high optical performance may be obtained while substantially downsizing the entire zoom lens. However, to obtain these effects, it is important to appropriately set a lens configuration of the zoom lens, and to appropriately set the arrangement of the reflecting unit in the optical path. It is also important to appropriately determine the refractive power of the lens units (or lens elements thereof), and other similar parameters.

For example, it is important to appropriately set the number of lens units, the refractive power of the lens units closer to the object side than the reflecting unit, a moving condition of the lens units during zooming, a distance between the lens unit for zooming and the reflecting unit, and the like. If these configurations are not appropriately set, it is unlikely or at least difficult to obtain the above desired effects.

A retractable and optical-path-bending zoom lens discussed in U.S. Pat. No. 7,382,548 includes a first lens unit having positive refractive power, a second lens unit having negative refractive power, a third lens unit having positive refractive power, and a fourth lens unit having positive refractive power, and moves the lens units to perform zooming. A bending unit (prism) that bends an optical path is arranged between the second lens unit and the third lens unit to realize thinning of camera.

The first and second exemplary embodiments of U.S. Pat. No. 7,382,548 discuss a zoom lens having a zoom ratio of about 6, in which the first and second lens units to be moved during zooming are arranged closer to an object side than a reflecting unit. In these exemplary embodiments, amounts of movement of the first and second lens units during zooming from a wide-angle end to a telephoto end are small, and thus, it is necessary to increase the refractive power of the first and second lens units to realize a high zoom ratio. As a result, favorable correction of spherical aberration and curvature of field become difficult in the entire zooming area.

The bending variable power optical system discussed in Japanese Patent Application Laid-Open No. 2007-279541 includes a first lens unit having positive refractive power, a second lens unit having negative refractive power, a reflection mirror, a third lens unit having positive refractive power, and a fourth lens unit having positive refractive power. Then, the reflection mirror is folded when not capturing an image, and the first and second lens units are retracted, so that the thinning of camera when not capturing an image is realized.

The first, second, and fourth exemplary embodiments in Japanese Patent Application Laid-Open No. 2007-279541 discuss a zoom lens having a zoom ratio of about 8. When it is intended to realize a high zoom ratio in these exemplary embodiments, the first lens unit is arranged closer to the object side at a wide-angle end. As a result, a front lens effective diameter at the wide-angle end is increased, and the entire zoom lens is increased in size. Meanwhile, when it is intended to decrease the amount of movement of the second lens unit to reduce the front lens effective diameter, it is necessary to increase the refractive power of the second lens unit to secure a predetermined zoom ratio. As a result, correction of curvature of field becomes difficult in the entire zooming area.

In the third to fifth exemplary embodiments of U.S. Pat. No. 7,382,548 and the third exemplary embodiment of Japanese Patent Application Laid-Open No. 2007-279541, the second lens unit is not moved during zooming. When it is intended to realize a high zoom ratio in these exemplary embodiments, the amount of movement of the first lens unit is further increased, and the front lens effective diameter at the telephoto end is increased. In addition, it is necessary to increase the refractive power of the second lens unit. Therefore, the correction of curvature of field becomes difficult in the entire zooming area.

SUMMARY OF THE INVENTION

The present invention is directed to a zoom lens having a small size in its entirety and having a high zoom ratio, and capable of obtaining a favorable image and realizing a thin camera, and is also directed to an image pickup apparatus including the zoom lens.

According to an aspect of the present invention, a zoom lens includes, in order from an object side to an image side, a first lens unit having positive refractive power, a second lens unit having negative refractive power, a reflecting unit for bending an optical path, and a rear lens group including two or more lens units, wherein, during zooming, the first and second lens units are moved and the reflecting unit is not moved, and wherein the following conditions are satisfied:

$$0.42 < (d2w - X1)/DR < 1.00$$

$$0.50 < |X1|/d2w < 5.00$$

$$0.36 < |f2|/d2w < 3.00,$$

where an amount of movement of the first lens unit during zooming from a wide-angle end to a telephoto end is X1, a distance on an optical axis from a reflection surface of the reflecting unit to an image plane is DR, and a distance on the optical axis from a lens surface of the second lens unit closest to the image side to the reflection surface of the reflecting unit at the wide-angle end is d2w, and a focal length of the second lens unit is f2.

Further features of the present invention will become apparent from the following description of exemplary embodiments with reference to the attached drawings.

BRIEF DESCRIPTION OF THE DRAWINGS

FIGS. 2A, 2B, and 2C are aberration diagrams of the first exemplary embodiment at the wide-angle end, a middle zoom position, and a telephoto end, respectively.

FIGS. 4A, 4B, and 4C are aberration diagrams of the second exemplary embodiment at the wide-angle end, a middle zoom position, and a telephoto end, respectively.

FIGS. 6A, 6B, and 6C are aberration diagrams of the third exemplary embodiment at the wide-angle end, a middle zoom position, and a telephoto end, respectively.

FIGS. 8A, 8B, and 8C are aberration diagrams of the fourth exemplary embodiment at the wide-angle end, a middle zoom position, and a telephoto end, respectively.

FIGS. 10A, 10B, and 10C are aberration diagrams of the fifth exemplary embodiment at the wide-angle end, a middle zoom position, and a telephoto end, respectively.

DESCRIPTION OF THE EMBODIMENTS

Various exemplary embodiments, features, and aspects of the invention will be described in detail below with reference to the drawings.

A zoom lens according to exemplary embodiments of the present invention includes, in order from an object side to an image side, a first lens unit having positive refractive power, a second lens unit having negative refractive power, a reflecting unit for bending an optical axis, which is made of a reflection mirror or a reflection prism, and bends an optical axis by 90 degrees or 90 degrees±10 degrees or less, and a rear lens group including two or more lens units. At least the first and second lens units are moved during zooming. During zooming, the reflecting unit is not moved.

In storing the lens units in a retracted manner, the reflecting unit is moved into a position different from that in an image-capturing state. Then, at least a part of the first lens unit and the second lens unit is stored in a space caused by the movement of the reflecting unit in a retracted manner.

Figure 1:
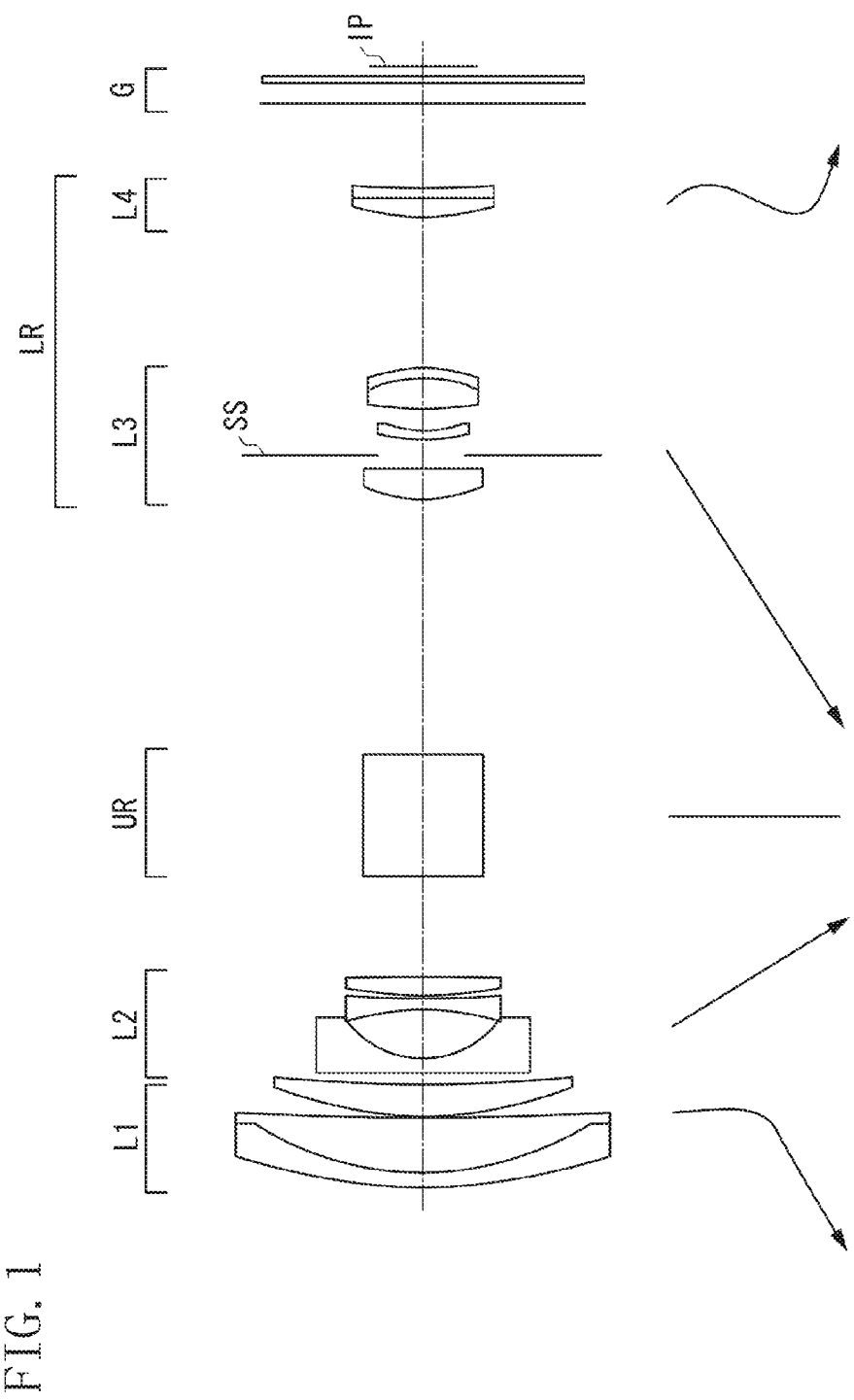
FIG. 1 is a lens cross-sectional view of a first exemplary embodiment at a wide-angle end.
Figure 2B:
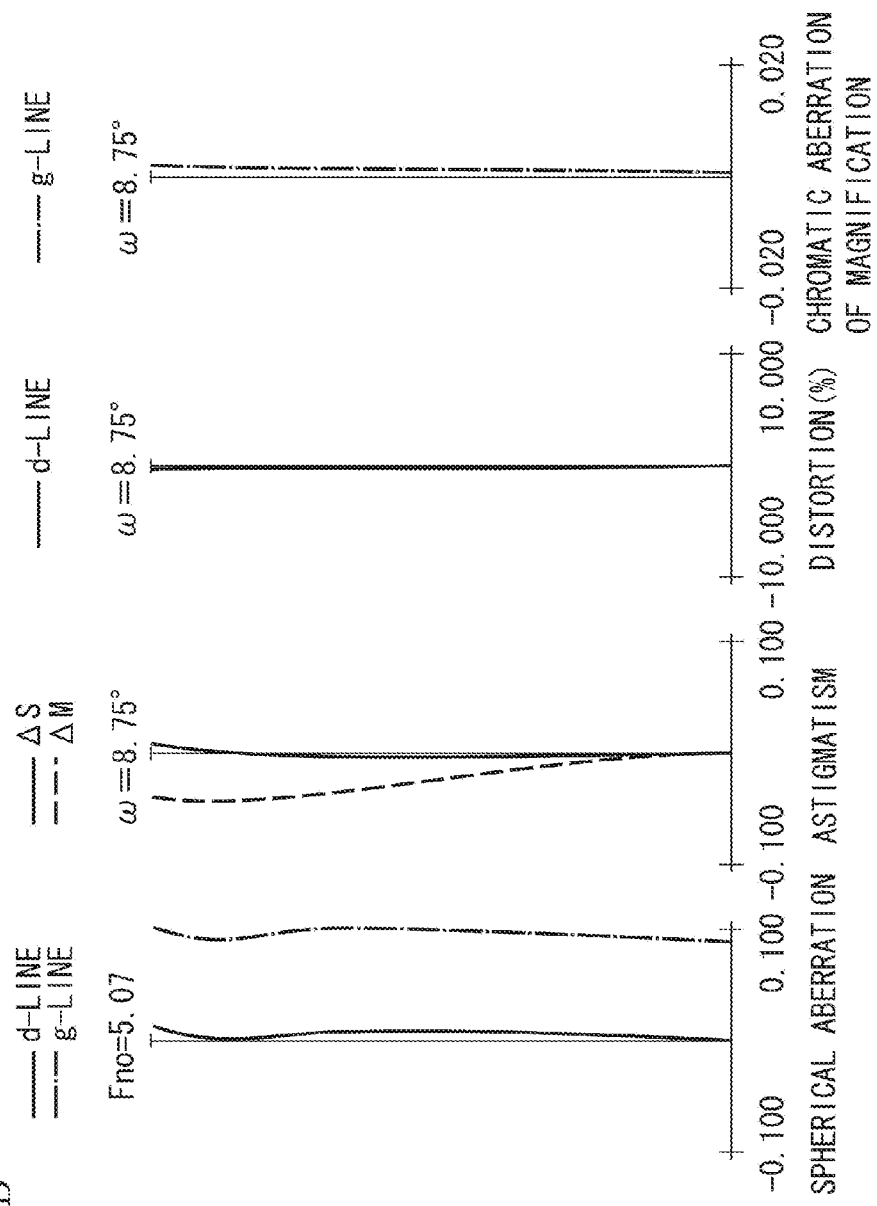
Figure 2C:
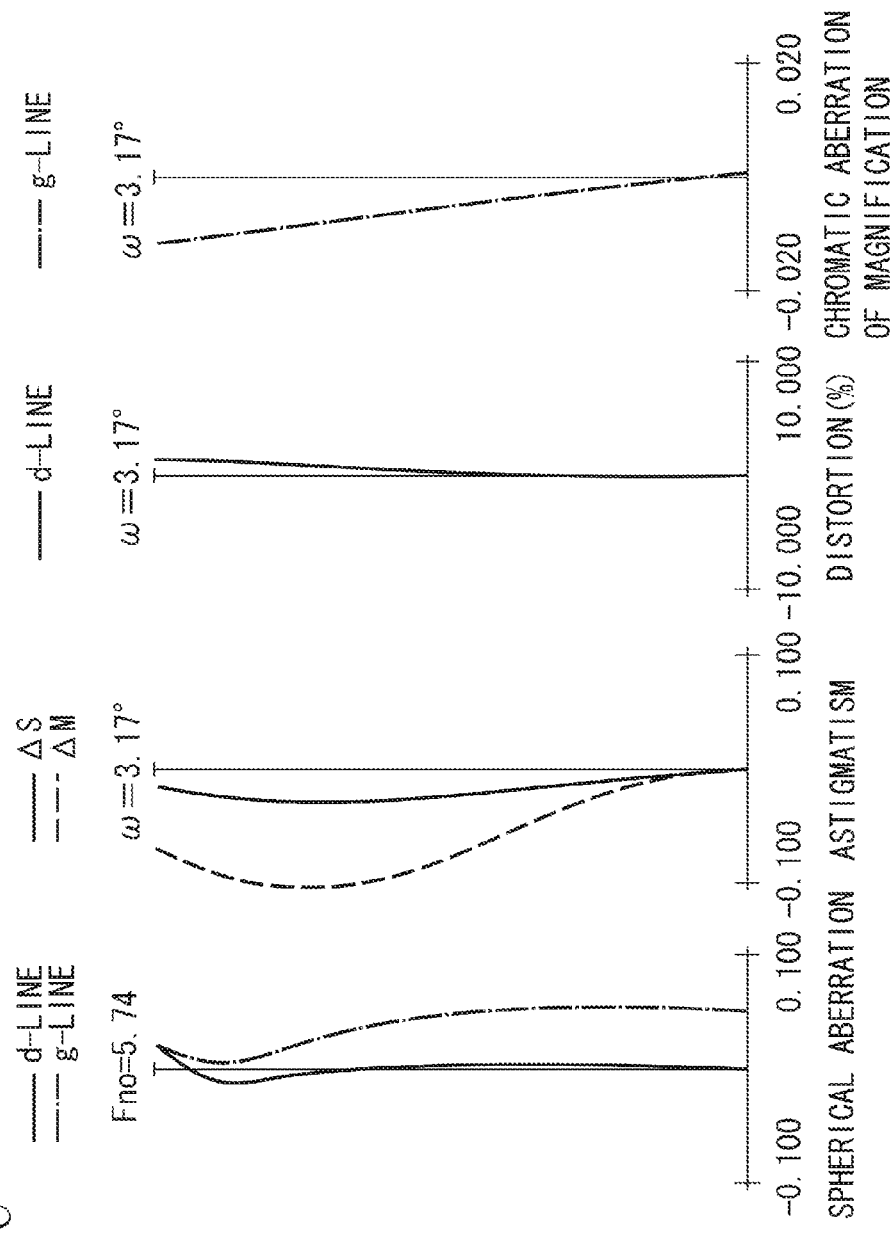
Figure 3:
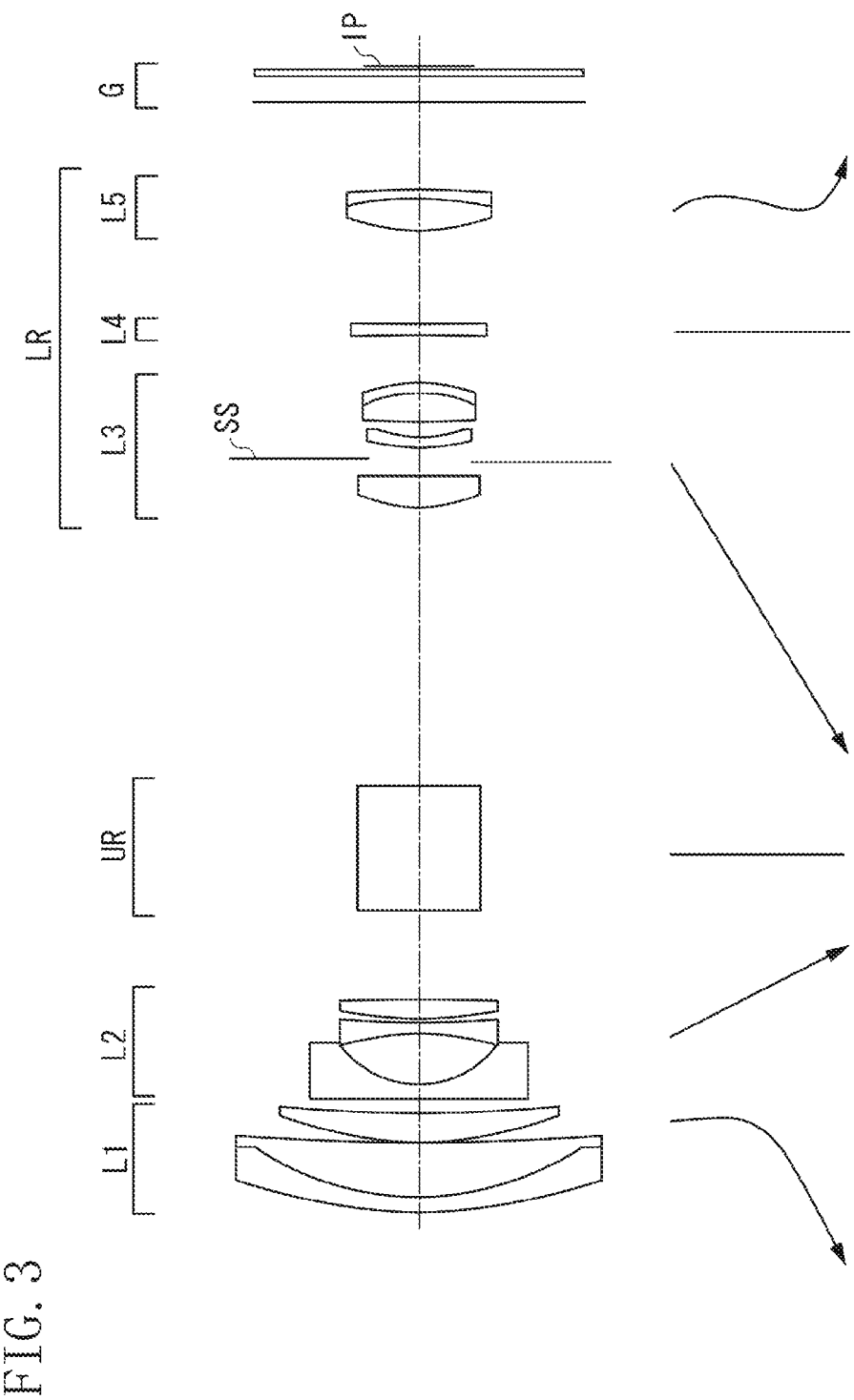
FIG. 3 is a lens cross-sectional view of a second exemplary embodiment at a wide-angle end.
Figure 4A:
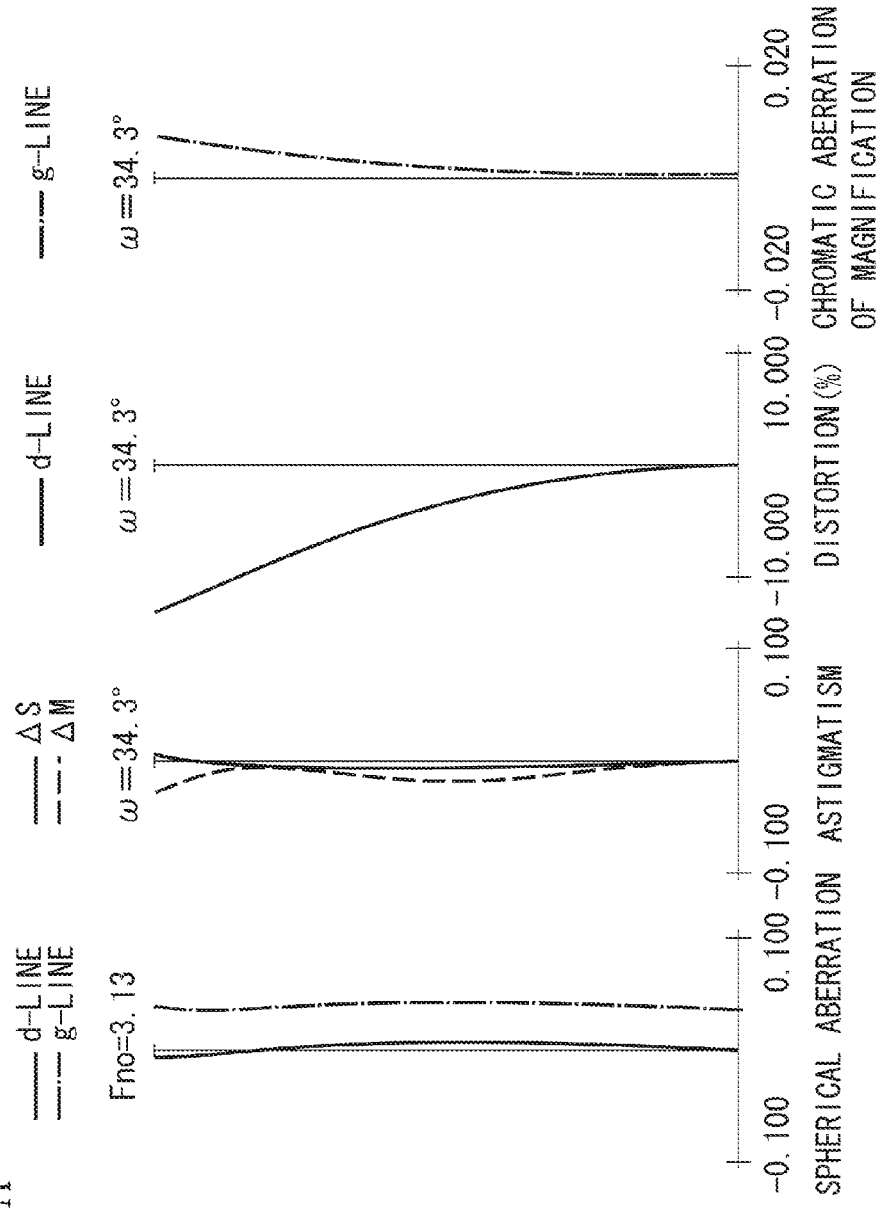

FIG. 1 is a lens cross-sectional view of a zoom lens of a first exemplary embodiment of the present invention when an optical path is developed at a wide-angle end (short focal length end). FIGS. 2A, 2B, and 2C are aberration diagrams of the zoom lens of the first exemplary embodiment at the wide-angle end, a middle zoom position, and a telephoto end (long focal length end), respectively. FIG. 3 is a lens cross-sectional view of a zoom lens of a second exemplary embodiment of the present invention when an optical path is developed at a wide-angle end. FIGS. 4A, 4B, and 4C are aberration diagrams of the zoom lens of the second exemplary embodiment at the wide-angle end, a middle zoom position, and a telephoto end, respectively.

Figure 5:
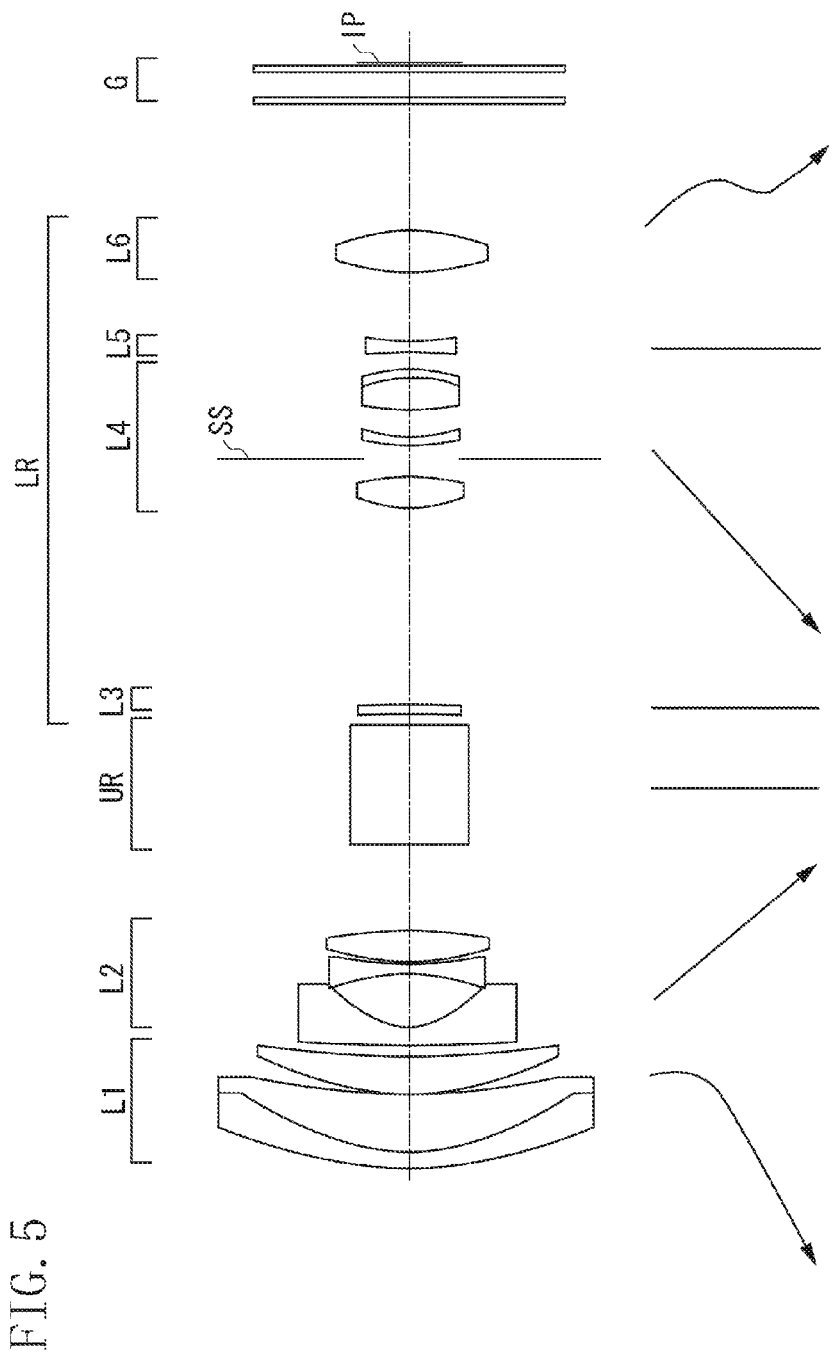
FIG. 5 is a lens cross-sectional view of a third exemplary embodiment at a wide-angle end.
Figure 6A:
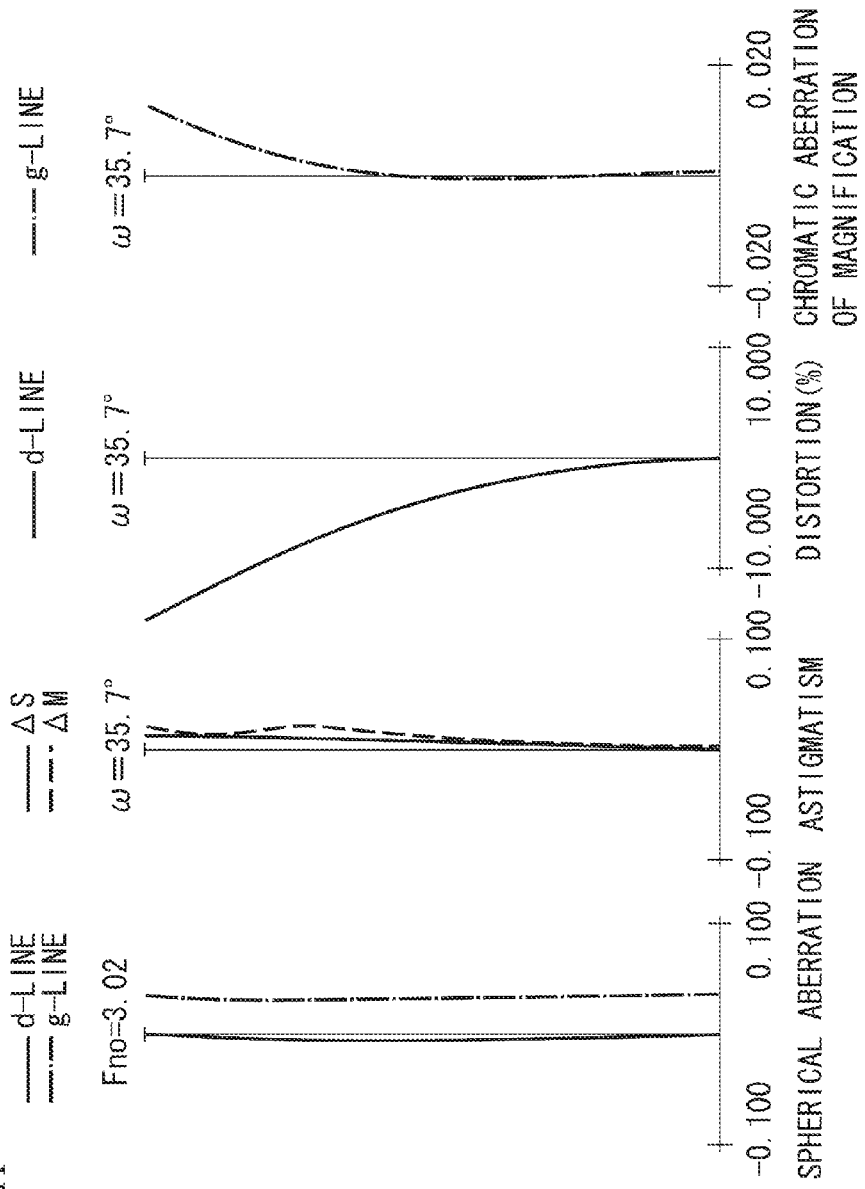
Figure 6C:
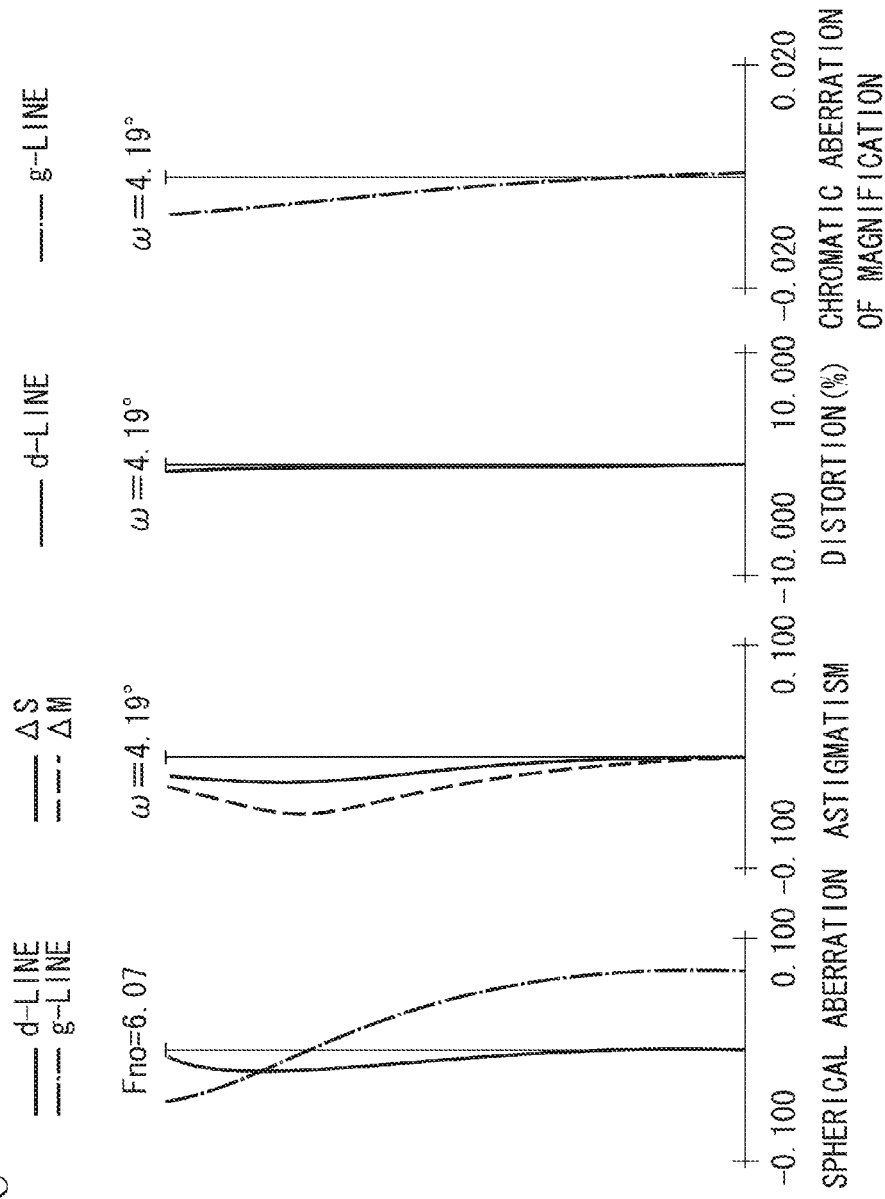
Figure 7:
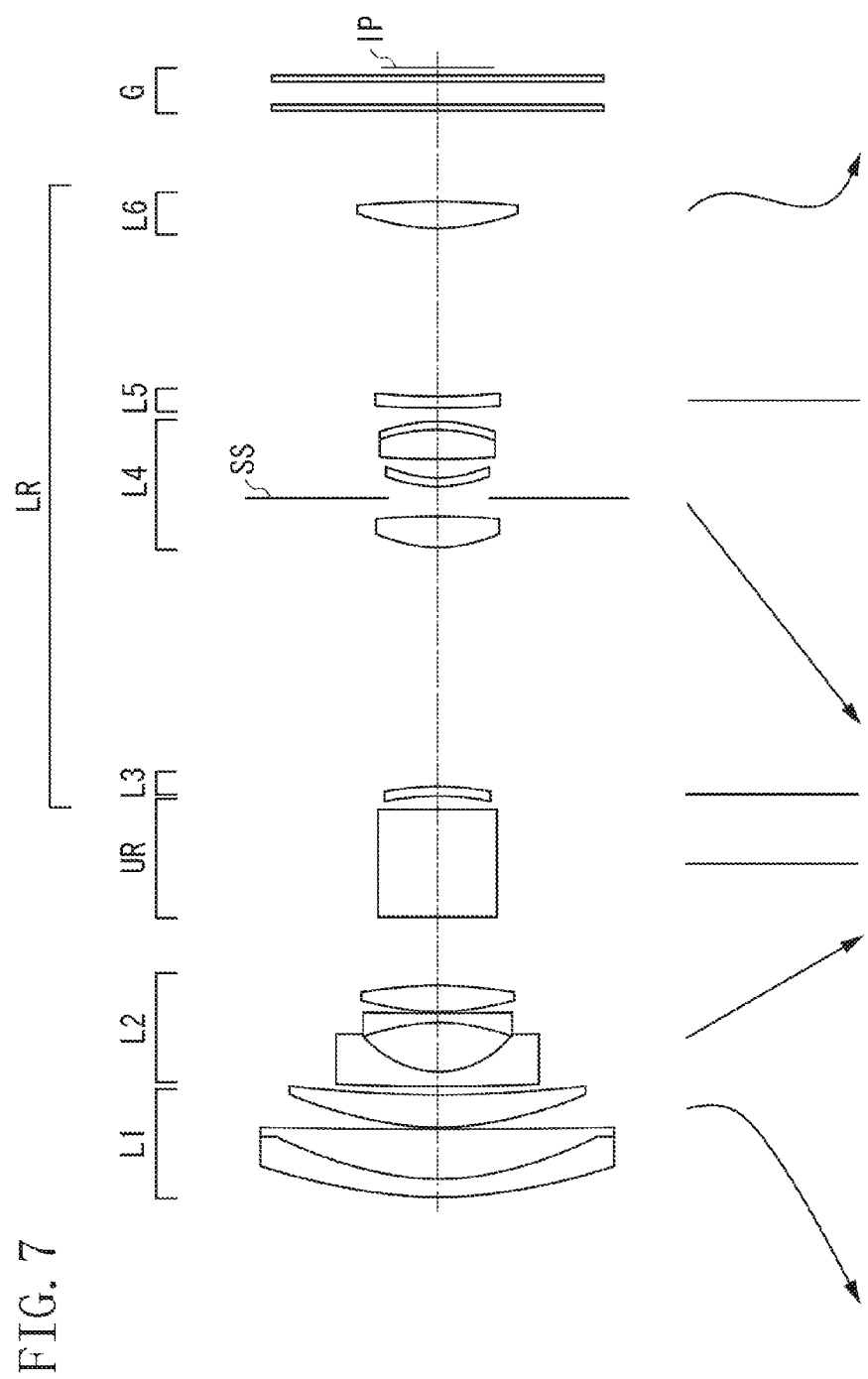
FIG. 7 is a lens cross-sectional view of a fourth exemplary embodiment at a wide-angle end.
Figure 8A:
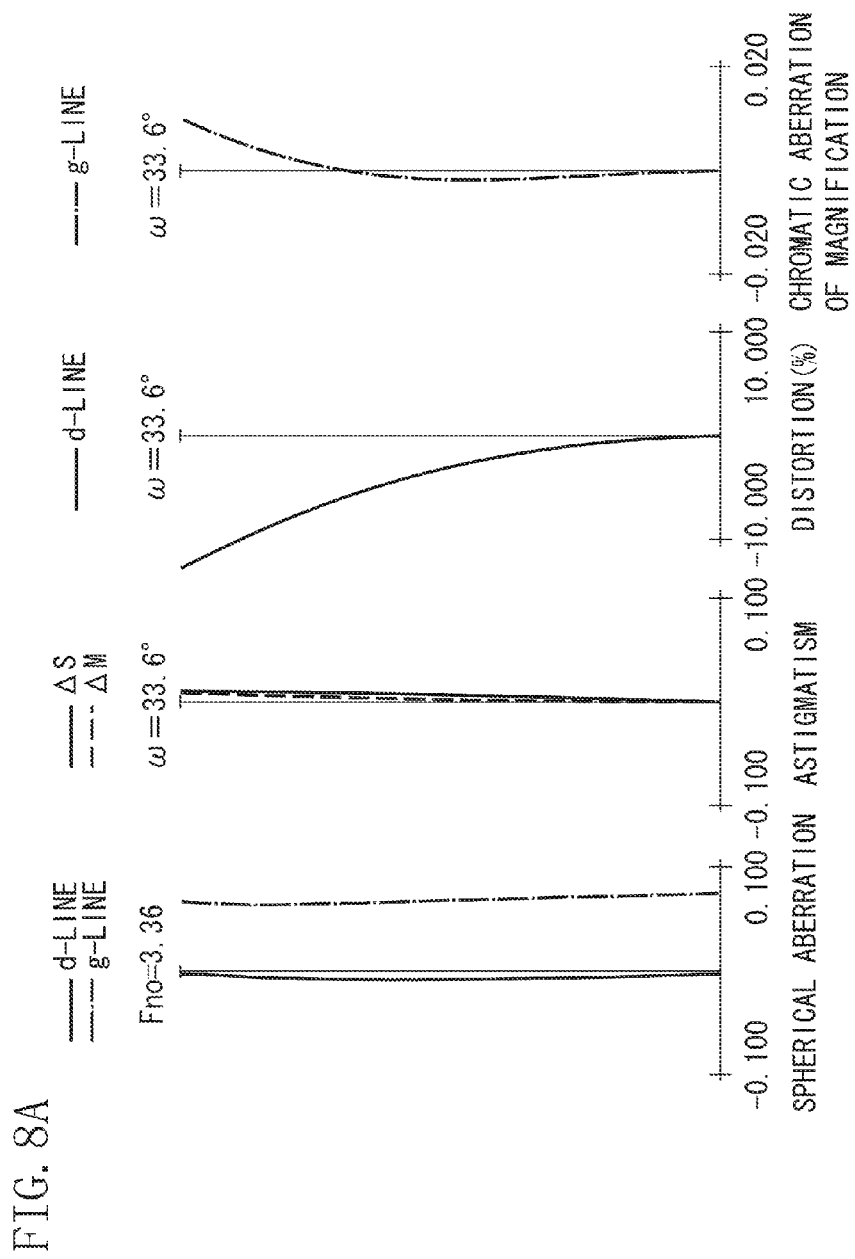
Figure 8C:
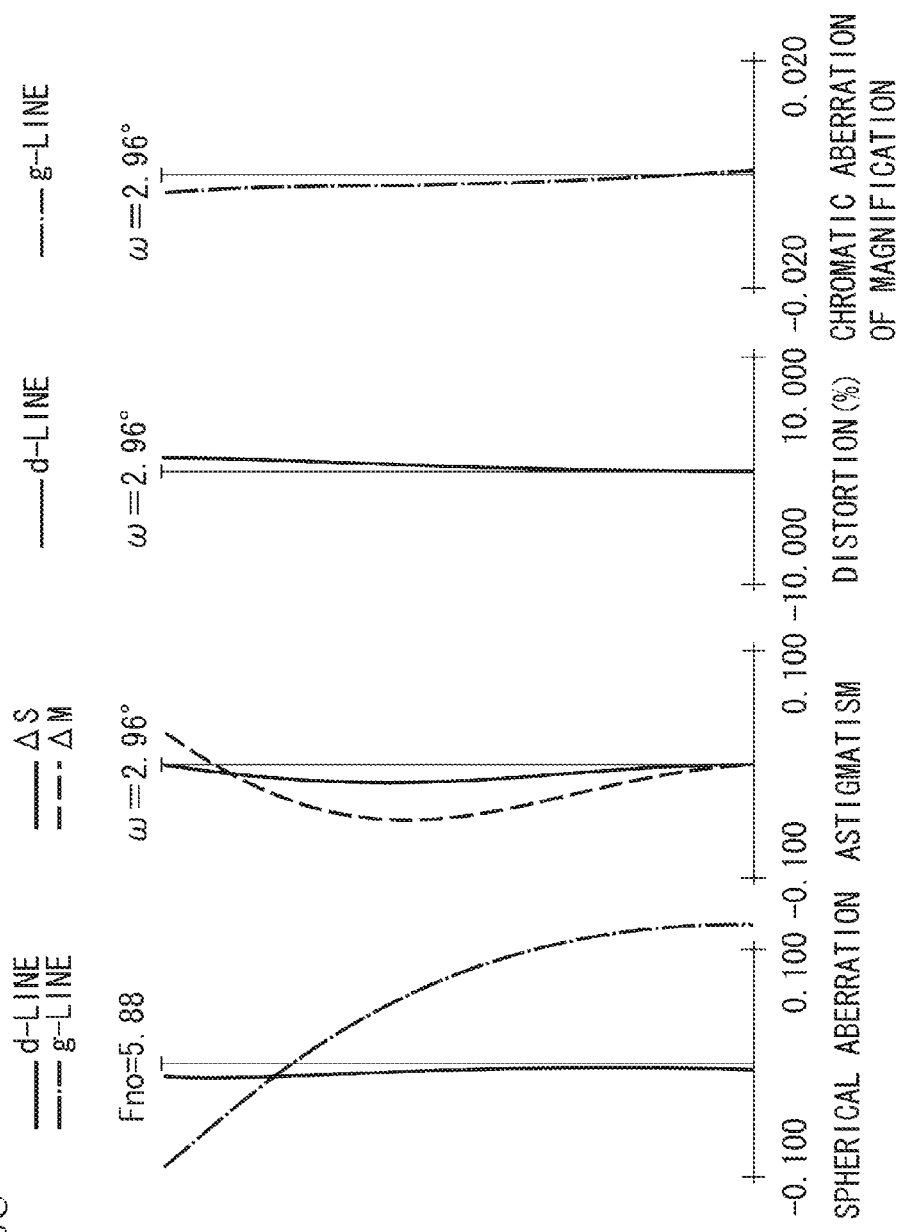

FIG. 5 is a lens cross-sectional view of a zoom lens of a third exemplary embodiment of the present invention when an optical path is developed at a wide-angle end. FIGS. 6A, 6B, and 6C are aberration diagrams of the zoom lens of the third exemplary embodiment at the wide-angle end, a middle zoom position, and a telephoto end, respectively. FIG. 7 is a lens cross-sectional view of a zoom lens of a fourth exemplary embodiment of the present invention when an optical path is developed at a wide-angle end. FIGS. 8A, 8B, and 8C are aberration diagrams of the zoom lens of the fourth exemplary embodiment at the wide-angle end, a middle zoom position, and a telephoto end, respectively.

Figure 9:
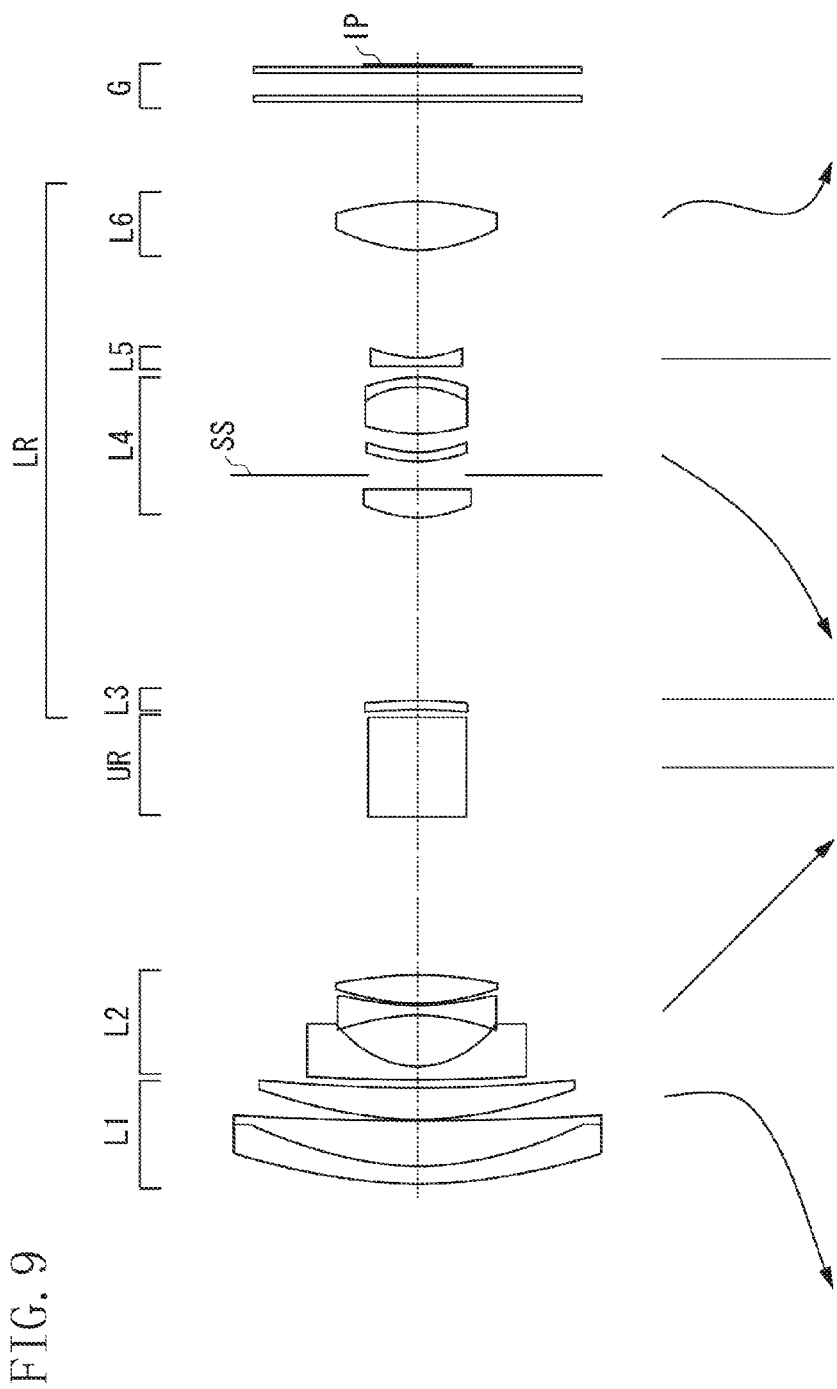
FIG. 9 is a lens cross-sectional view of a fifth exemplary embodiment at a wide-angle end.
Figure 10A:
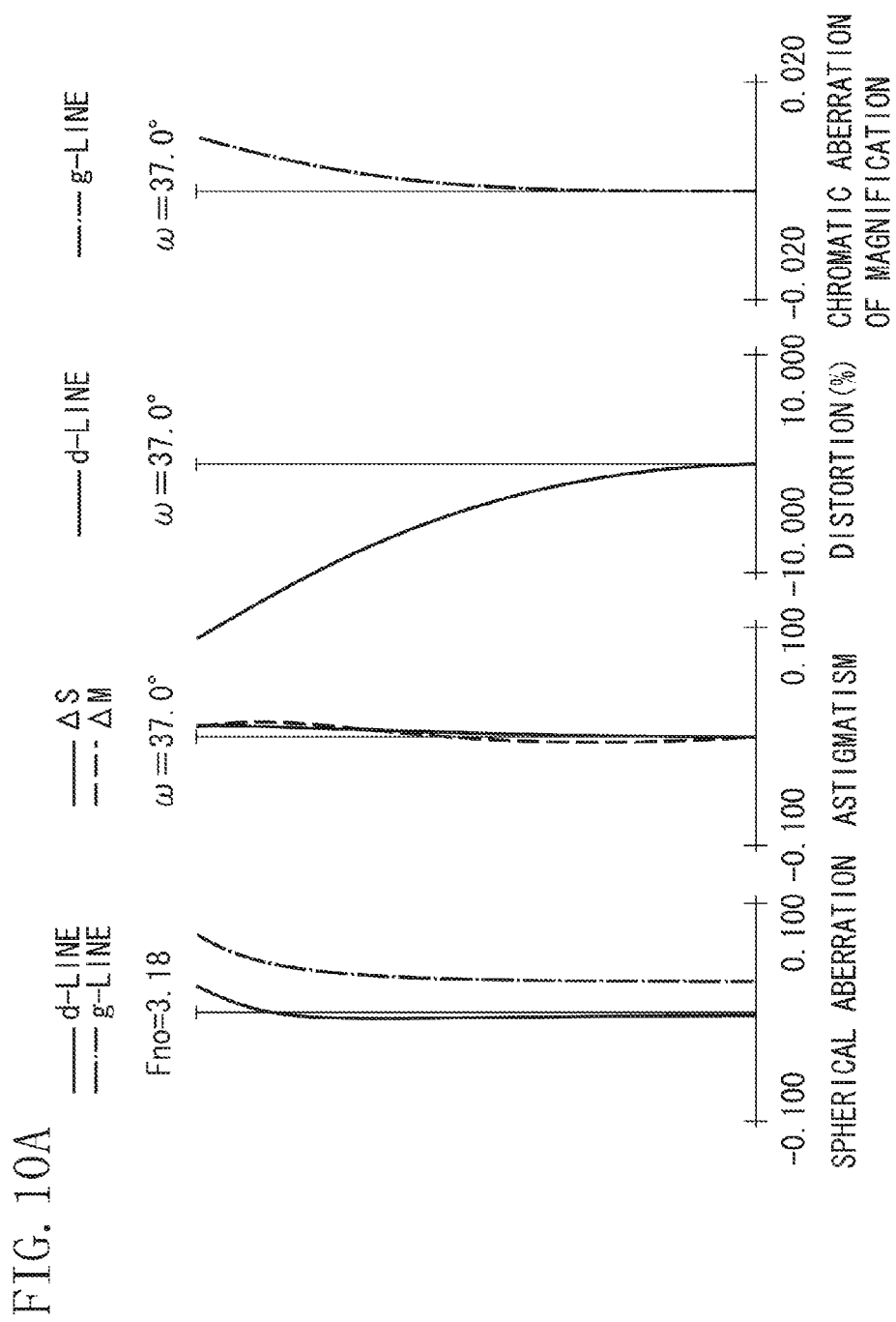
Figure 10C:
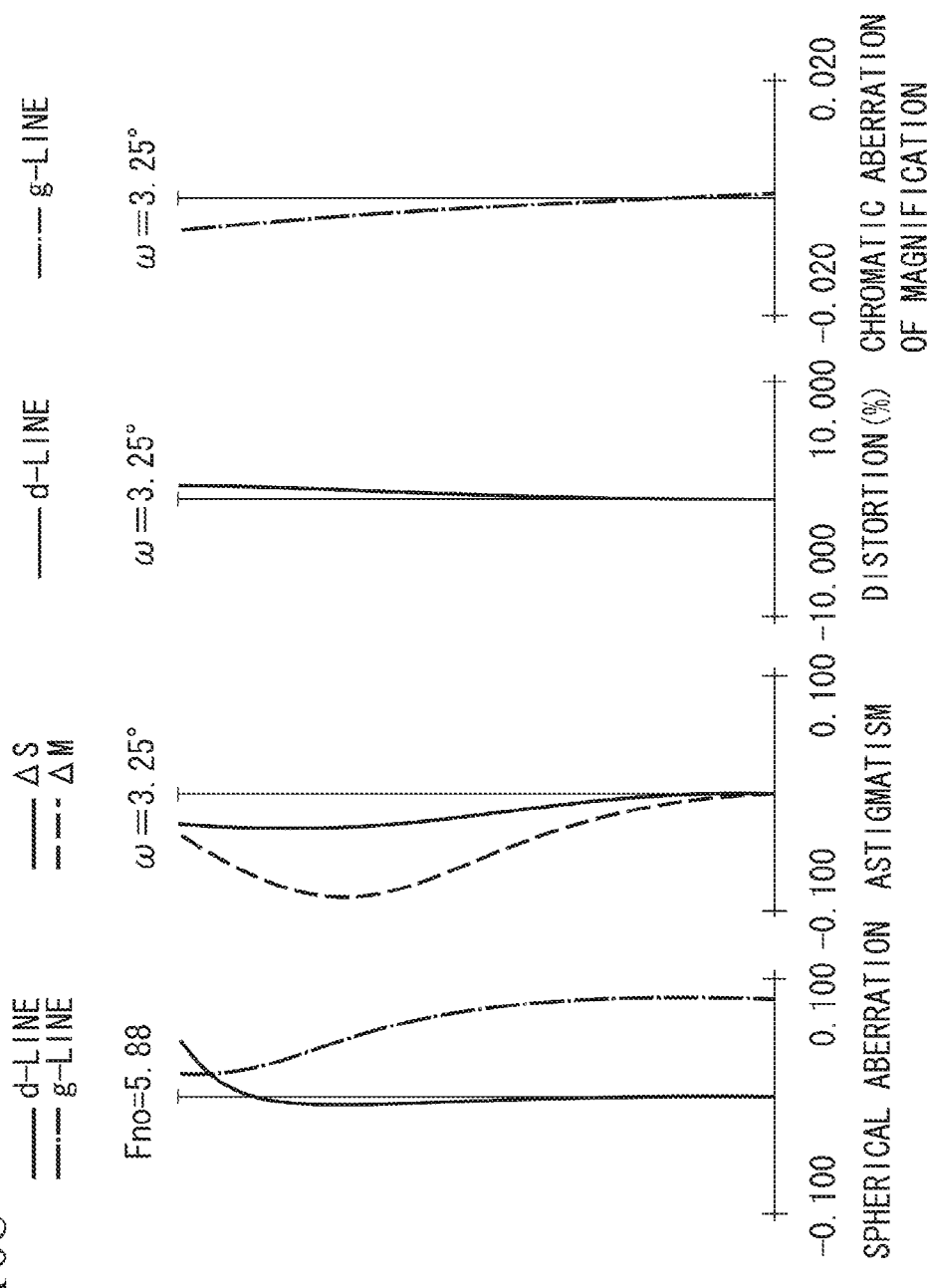
Figure 11A:
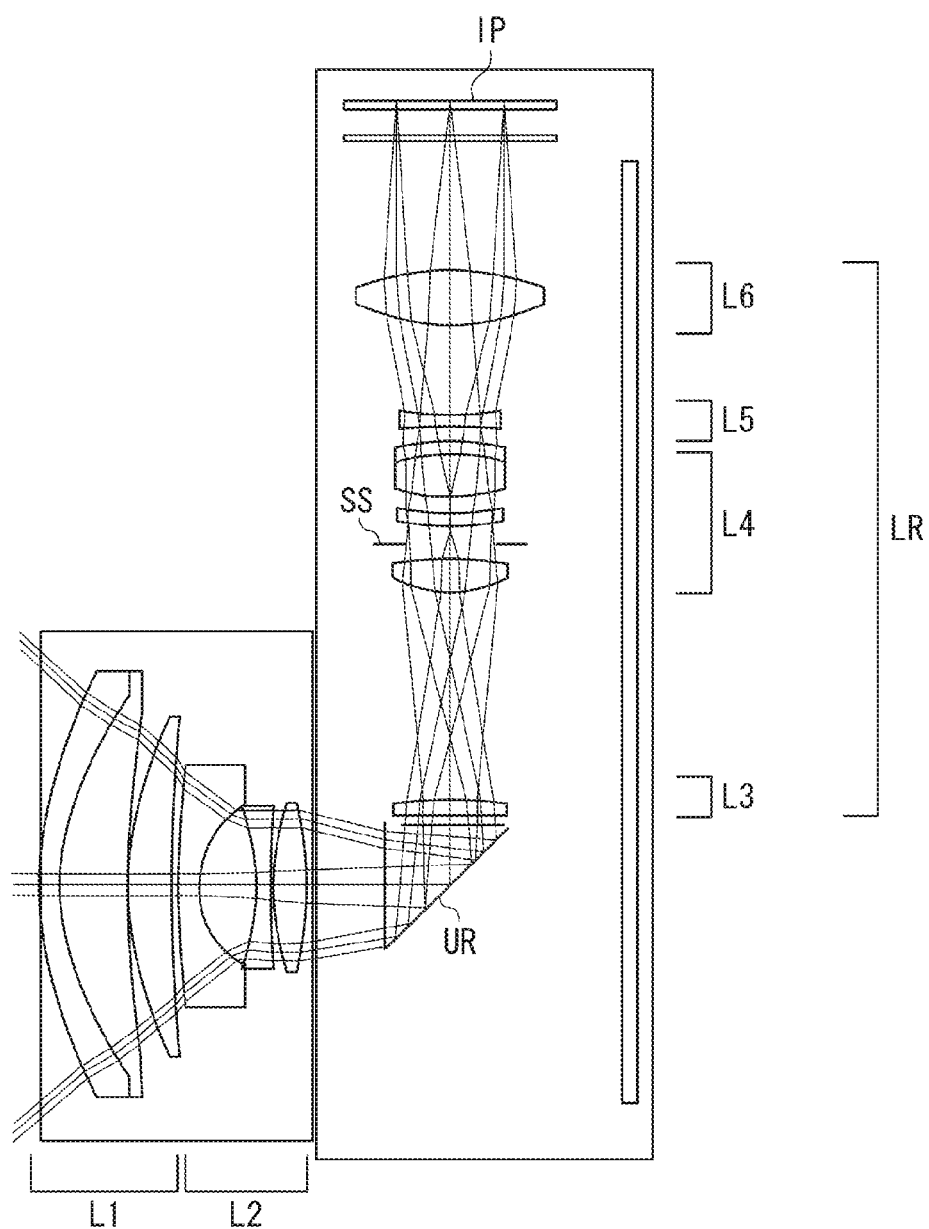
FIGS. 11A and 11B are schematic configuration diagrams of an image pickup apparatus using a zoom lens according to an exemplary embodiment of the present invention.
Figure 11B:
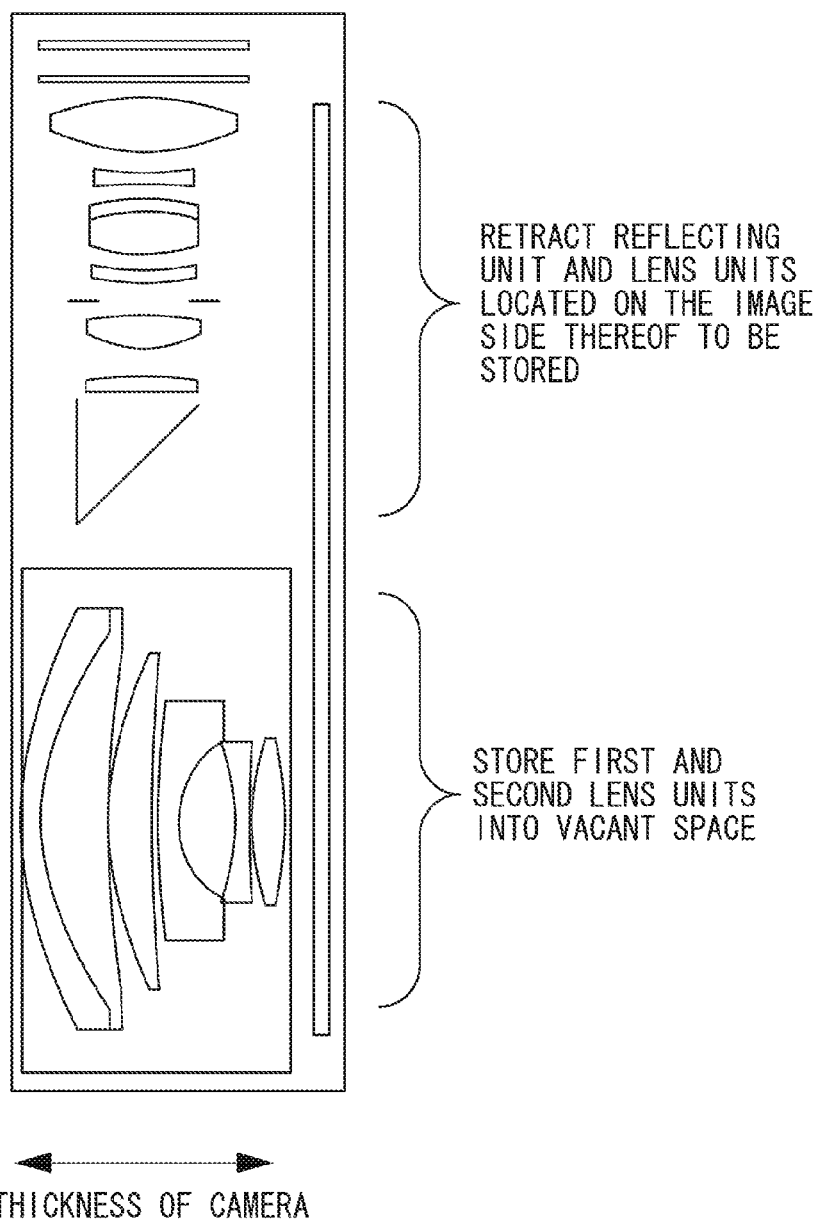
Figure 12:
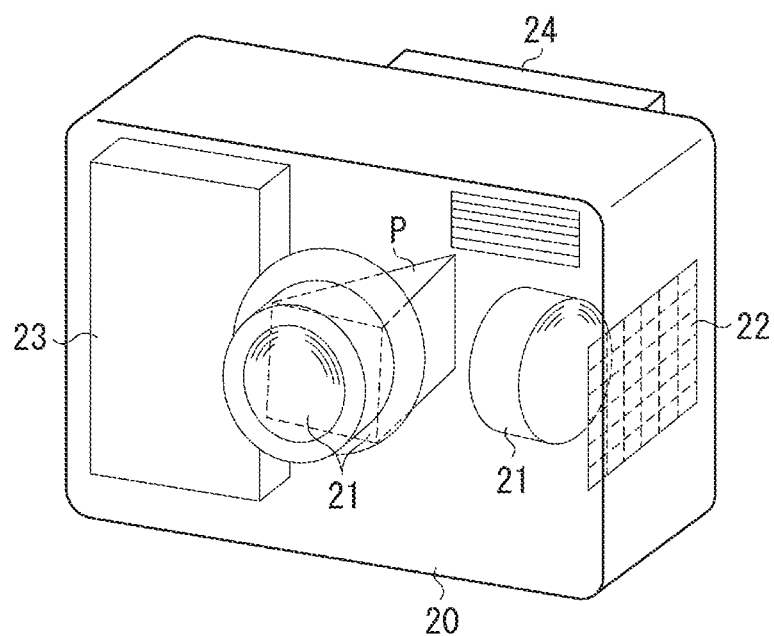
FIG. 12 is a schematic configuration diagram of an image pickup apparatus using a zoom lens according to an exemplary embodiment of the present invention.

FIG. 9 is a lens cross-sectional view of a zoom lens of a fifth exemplary embodiment of the present invention when an optical path is developed at a wide-angle end. FIGS. 10A, 10B, and 10C are aberration diagrams of the zoom lens of the fifth exemplary embodiment at the wide-angle end, a middle zoom position, and a telephoto end, respectively. FIGS. 11A and 11B are main component schematic diagrams of an image pickup apparatus when an optical axis of the zoom lens of the third exemplary embodiment of the present invention is bent by a reflecting unit for bending an optical path and when the zoom lens is stored in a camera body. FIG. 12 is a main component schematic diagram of an image pickup apparatus according to an exemplary embodiment of the present invention.

The first to fifth exemplary embodiments respectively correspond to numerical examples 1 to 5 described below. The zoom lens in each of the exemplary embodiment is a photographic optical system used in an image pickup apparatus, and the left side represents an object side (front side) and the right side represents an image side (rear side) in the lens cross-sectional view in which an optical path is developed. Note that, when the zoom lens in each exemplary embodiment is used as a projection lens of a projector, and the like, a screen is positioned at the left side and an image to be projected is positioned at the right side in the lens cross-sectional view in which an optical path is developed. In the lens cross-sectional view, the order of a lens unit from the object side is represented by i, and the i-th lens unit is represented by Li.

A rear lens group LR includes two or more lens units. An aperture stop is represented by SS. A reflecting unit UR is made of a reflection mirror that bends the optical axis of the zoom lens by 90 degrees±10 degrees or less, or of a prism using internal reflection. The arrows indicate movement loci of the lens units during zooming from the wide-angle end to the telephoto end.

An optical block G corresponds to an optical filter, a face plate, and the like. An image plane IP corresponds to an imaging surface of a solid-state image sensor (photoelectric conversion element) of a charge-coupled device (CCD) sensor, a complementary metal-oxide semiconductor (CMOS) sensor, and the like when used as a photographic optical system of a video camera or a digital camera, and corresponds to a film surface when used as an imaging optical system of a silver-halide film camera.

Each exemplary embodiment includes, in order from the object side to the image side, a first lens unit having positive refractive power, a second lens unit having negative refractive power, a reflecting unit for bending an optical path, and a rear lens group including two or more lens units. The rear lens group LR includes the aperture stop SS.

The rear lens group LR in FIG. 1 includes a third lens unit having positive refractive power and a fourth lens unit having positive refractive power in order from the object side to the image side. The rear lens group LR in FIG. 3 includes a third lens unit having positive refractive power, a fourth lens unit having negative refractive power, and a fifth lens unit having positive refractive power in order from the object side to the image side. The rear lens groups LR in FIGS. 5, 7 and 9 include a third lens unit having negative refractive power, a fourth lens unit having positive refractive power, a fifth lens unit having negative refractive power, and a sixth lens unit having positive refractive power in order from the object side to the image side.

In each aberration diagram, the d-line and the g-line are respectively represented by "d-line" and "g-line", and a meridional image plane and a sagittal image plane are respectively represented by ΔM and ΔS. Chromatic aberration of magnification (lateral chromatic aberration) is indicated by the g line. A half angle of view (degree) is represented by ω and an F-number is represented by Fno. Note that the wide-angle end and the telephoto end in each exemplary embodiment refer to zoom positions when a zooming lens unit is mechanically positioned at the respective ends of a movable range on the optical axis.

In each of the exemplary embodiments, two or more lens units are moved from among the first lens unit L1, the second lens unit L2, and a plurality of lens units included in the rear lens group LR, during zooming. Here, the reflecting unit UR is not moved for zooming.

By arranging the reflecting unit UR, which is not moved during zooming, the optical path of the zoom lens is bent and a space inside a camera body is effectively used. With this configuration, when applied to a camera while a high zoom ratio is secured, a thin zoom lens in a front and rear direction of the camera is achieved. Also, by arranging the first lens unit L1 having positive refractive power closest to the object side while performing zooming by moving at least the first lens unit L1 and the second lens unit L2, a wide angle of view and a high zoom ratio of the zoom lens are realized.

Further, an amount of movement of the first lens unit L1 during zooming from the wide-angle end to the telephoto end, and a position of the second lens unit L2 in an optical axis direction at the wide-angle end are appropriately set. With this configuration, the optical performance is favorably maintained while a high zoom ratio is realized.

Also, by appropriately setting the position of the second lens unit L2 in the optical axis direction at the wide-angle end, and the refractive power of the second lens unit L2, the optical performance in the entire zooming area is favorably maintained while the downsizing of the entire zoom lens is realized.

As described above, in each exemplary embodiment, the first lens unit L1 and the second lens unit L2 are movable during zooming. Further, the amount of movement of the first lens unit L1, the position of the second lens unit L2 in the optical axis direction at the wide-angle end, the refractive power of the second lens unit L2, and the like are appropriately set. Accordingly, increasing in size of the front lens effective diameter is suppressed while a high zoom ratio is realized.

In each exemplary embodiment, the amount of movement of the first lens unit L1 during zooming from the wide-angle end to the telephoto end is X1. The amount of movement of the first lens unit L1 during zooming from the wide-angle end to the telephoto end refers to a difference between a position of the first lens unit L1 on the optical axis at the wide-angle end and a position of the first lens unit L1 on the optical axis at the telephoto end. In addition, the amount of movement X1 has a positive amount when the first lens unit L1 is positioned on the image side at the telephoto end compared with at the wide-angle end. The distance on the optical axis from a reflection surface of the reflecting unit UR to an image plane is DR. The distance on the optical axis from a lens surface of the second lens unit L2 closest to the image side to the reflection surface of the reflecting unit UR at the wide-angle end is d2w. A focal length of the second lens unit L2 is f2. Here, the following conditions are satisfied:

$$0.42 < (d2w - X1)/DR < 1.00 \quad (1)$$

$$0.50 < |X1|/d2w < 5.00 \quad (2)$$

$$0.36 < |f2|/d2w < 3.00 \quad (3)$$

Next, technical meaning of the above-described conditions will be described.

Condition (1) defines the amount of movement of the first lens unit L1 during zooming from the wide-angle end to the telephoto end, and the position of the second lens unit L2 in the optical axis direction at the wide-angle end in comparison with the distance on the optical axis from the reflection surface of the reflecting unit UR to the image plane.

In the exemplary embodiment of the present invention, the arrangement of the first and second lens units closer to the object side than the reflecting unit UR defines a thickness direction of a camera, and the arrangement of the rear lens group closer to the image side than the reflecting unit UR defines the width of the camera or the size in a height direction. By satisfying Condition (1), moving spaces of the first and second lens units L1 and L2 for zooming are secured, a high zoom ratio is realized, high optical performance is obtained, and the downsizing of the camera size is realized by optimizing the arrangement of the lens units.

When the lower limit of Condition (1) is exceeded, the amount of movement of the first lens unit L1 becomes too small or the distance between the second lens unit L2 and the reflection surface of the reflecting unit UR becomes too small. Therefore, the moving space of the second lens unit L2 for zooming cannot be sufficiently secured. In either case, it becomes difficult to realize a high zoom ratio. When it is intended to realize a high zoom ratio under this state, a zooming effect due to the movement of the second lens unit L2 is compensated by the refractive power of the second lens unit L2, and, therefore, the refractive power of the second lens unit L2 is increased. In this case, the number of negative lenses in the second lens unit L2 is increased for aberration correction, and the thickness of the lens unit is increased, resulting in an increase in thickness of the camera.

Besides the above, a material of high refractive index and high dispersion is used for the negative lens in the second lens unit L2. Therefore, the Petzval sum of the entire zoom lens in the optical system is increased in a positive direction and correction of the curvature of field becomes difficult, and correction of the chromatic aberration in the second lens unit L2 also becomes difficult.

Meanwhile, when the upper limit is exceeded, the amount of movement of the first lens unit L1 becomes too large, or the distance between the second lens unit L2 and the reflection surface of the reflecting unit UR becomes too large. Therefore, the entire zoom lens is increased in size and the front lens effective diameter is increased.

Condition (2) defines the amount of movement of the first lens unit L1 during zooming from the wide-angle end to the telephoto end, and the distance between the second lens unit L2 and the reflection surface of the reflecting unit UR at the wide-angle end.

Here, the second lens unit L2 is arranged between the first lens unit L1, which is moved during zooming, and the reflecting unit UR, which is not moved during zooming, and is moved toward the image side during zooming from the wide-angle end to the telephoto end. Thus, the distance between the second lens unit L2 and the reflection surface of the reflecting unit UR at the wide-angle end determines a limit value for moving the second lens unit L2. Therefore, the first lens unit L1 is greatly moved toward the object side during zooming from the wide-angle end to the telephoto end, so that the first lens unit L1 is arranged closer to the image side at the wide-angle end, and an increase of the front lens effective diameter is suppressed.

When the lower limit of Condition (2) is exceeded, the amount of movement of the first lens unit L1 becomes too small with respect to the distance between the second lens unit L2 and the reflection surface of the reflecting unit UR at the wide-angle end. In this case, the first lens unit L1 is arranged closer to the object side at the wide-angle end, and, therefore, the front lens effective diameter is increased.

Meanwhile, when the upper limit is exceeded, the amount of movement of the first lens unit L1 becomes too large with respect to the distance between the second lens unit L2 and the reflection surface of the reflecting unit UR at the wide-angle end. In this case, the front lens effective diameter is increased at the telephoto end. In addition, the amount of movement of the second lens unit L2 for zooming cannot be sufficiently secured, and it becomes difficult to realize a high zoom ratio.

Condition (3) defines a position of the second lens unit L2 in the optical axis direction at the wide-angle end and the refractive power of the second lens unit L2. Condition (3) is used to favorably maintain the optical performance when it is intended to realize the downsizing of the front lens effective diameter and a high zoom ratio. When the lower limit of Condition (3) is exceeded, the negative refractive power of the second lens unit L2 becomes too large, and curvature of field widely varies in the entire zooming area and the correction thereof becomes difficult. Besides the above, a distance between the second lens unit L2 and a bending position of the optical axis in the zoom lens at the wide-angle end becomes too large, and thus it becomes difficult to arrange the first lens unit L1 closer to the object side at the wide-angle end, and the front lens effective diameter is increased.

Meanwhile, when the upper limit is exceeded, the refractive power of the second lens unit L2 becomes too small, or the distance between the second lens unit L2 and the reflection surface of the reflecting unit UR becomes too small. In either case, a zooming load of the second lens unit L2 becomes too small, and it is difficult to realize a high zoom ratio.

In the exemplary embodiments, numerical value ranges of conditions (1) to (3) are favorably set as follows:

$$0.425 < (d2w - X1)/DR < 0.800 \quad (1a)$$

$$0.70 < |X1|/d2w < 3.50 \quad (2a)$$

$$0.40 < |f2|/d2w < 2.00 \quad (3a)$$

In the exemplary embodiments, the numerical value ranges of conditions (1a) to (3a) are more favorably set as follows:

$$0.43 < (d2w - X1)/DR < 0.60 \quad (1b)$$

$$0.90 < |X1|/d2w < 2.00 \quad (2b)$$

$$0.45 < |f2|/d2w < 1.00 \quad (3b)$$

As described above, according to the exemplary embodiments, a zoom lens capable of easily obtaining a high zoom ratio and realizing downsizing of the front lens effective diameter can be obtained.

Further, it is favorable to satisfy one or more of the following conditions in the zoom lens of the present invention. A composite lateral magnification of the rear lens group LR when focusing on an infinite-distance object at the telephoto end is βLRt, and a composite lateral magnification of the rear lens group LR when focusing on an infinite-distance object at the wide-angle end is βLRw. The focal length of the entire zoom lens at the telephoto end is ft, and the focal length of the entire zoom lens at the wide-angle end is fw, and conditions are as follows:

$$ZLR = \beta LRt/\beta LRw$$

$$Z = ft/fw$$

The Abbe number of a material of a positive lens having the smallest Abbe number among positive lenses constituting the second lens unit L2 is νd2p. An average refractive index of materials of the lenses constituting the second lens unit L2 is nd2ave. The Abbe number and the refractive index of a material of a positive lens having the largest Abbe number among positive lenses constituting the first lens unit L1 are νd1p and n1dp, respectively. The focal length of the first lens unit L1 is f1. The focal length of the second lens unit L2 is f2. At this time, it is favorable to satisfy one or more of the following conditions:

$$0.10 < ZLR/Z < 0.35 \quad (4)$$

$$10.0 < \nu d2p < 20.0 \quad (5)$$

$$1.83 < nd2\text{ave} < 2.30 \quad (6)$$

$$60.0 < \nu d1p < 100.0 \quad (7)$$

$$1.40 < nd1p < 1.70 \quad (8)$$

$$4.3 < |f1/f2| < 8.0 \quad (9)$$

$$0.2 < |f1/ft| < 1.0 \quad (10)$$

$$0.05 < |f2|/ft < 0.16 \quad (11)$$

Next, technical meaning of the above-described conditions will be described.

Condition (4) defines a zooming load of the rear lens group LR arranged closer to the image side than the reflecting unit UR. When Condition (4) is satisfied, zooming can be shared by lens units located in front of and behind the reflecting unit UR in a balanced manner, and a high zoom ratio and the downsizing of the entire zoom lens can be easily realized. When the lower limit of Condition (4) is exceeded, the zooming load of the rear lens group LR becomes too small, and the zooming load of the lens units closer to the object side than the reflecting unit UR is increased. In this case, the amounts of movement of the first and second lens units L1 and L2 arranged closer to the object side than the reflecting unit UR become too large during zooming, and the entire zoom lens is increased in size.

Also, when the first and second lens units L1 and L2 are retracted when not capturing an image, a barrel of each lens unit is increased in size in response to the increase of the amounts of movement, and the thickness of the camera is increased. Meanwhile, when the upper limit is exceeded, the zooming load of the rear lens group becomes too large. In this case, a pupil variation of the entire zoom lens is increased and the lens units closer to the image side than the reflecting unit UR are increased in size, and the width of the camera is increased.

Condition (5) defines the Abbe numbers of the materials of the positive lenses included in the second lens unit L2. When a high dispersion material that satisfies Condition (5) is used for at least one of the positive lenses in the second lens unit L2, thinning of the second lens unit L2 can be easily realized while the refractive power of each lens in the second lens unit L2 can be decreased and the achromatic in the second lens unit L2 is realized.

When the lower limit of Condition (5) is exceeded, the dispersion of the materials for the positive lenses becomes too large, and chromatic aberration in the second lens unit L2 is overcorrected. Meanwhile, when the upper limit is exceeded, the dispersion of the materials of the positive lenses becomes too small, the power of each lens for achromatic in the second lens unit L2 is increased, and thinning of the second lens unit L2 becomes difficult.

Condition (6) defines an average refractive index of the materials of all lenses included in the second lens unit L2. When the average refractive index of the materials of the lenses in the second lens unit L2 is configured to satisfy Condition (6), the thinning of the second lens unit L2 can be easily realized.

When the lower limit of Condition (6) is exceeded, the average refractive index becomes too low, and the thickness of the second lens unit L2 is increased and the correction of curvature of field becomes difficult at the wide-angle end. Meanwhile, when the upper limit is exceeded, the average refractive index becomes too high, the Petzval sum of the entire zoom lens is increased in a positive direction, and the correction of curvature of field in the entire zooming area becomes difficult.

Condition (7) defines the Abbe numbers of the materials of the positive lenses included in the first lens unit L1. When a low dispersion material that satisfies Condition (7) is used for at least one of the positive lenses in the first lens unit L1, the correction of chromatic aberration can be easily performed throughout the entire zooming area from the wide-angle end to the telephoto end.

When the lower limit of Condition (7) is exceeded, the dispersion of the materials of the positive lenses becomes too large, and the correction of lateral chromatic aberration at the wide-angle end and axial chromatic aberration at the telephoto end is insufficient. Meanwhile, when the upper limit is exceeded, although it is favorable for the correction of chromatic aberration, the thickness of the first lens unit L1 is increased since the refractive index of the material in this area tends to be low, and the correction of spherical aberration and coma at the telephoto end becomes difficult.

Condition (8) defines the refractive index of the material of the positive lens having the largest Abbe number included in the first lens unit L1. When the refractive index of the material of the positive lens having the largest Abbe number is included in the first lens unit L1, is configured to satisfy Condition (8), the thickness of the first lens unit L1 can be reduced and the correction of spherical aberration and coma at the telephoto end can be easily performed.

When the lower limit of Condition (8) is exceeded, the refractive index of the material for the positive lens becomes too low, and the thickness of the first lens unit L1 is increased and the correction of spherical aberration and coma at the telephoto end becomes difficult. Meanwhile, when the upper limit is exceeded, the refractive index of the material of the positive lens becomes too high, the low dispersion material cannot be selected. Therefore, the correction of lateral chromatic aberration at the wide-angle end and axial chromatic aberration at the telephoto end becomes difficult.

Condition (9) defines the ratio of the refractive power of the first lens unit L1 to the second lens unit L2, which is favorable to realize a high zoom ratio. When the refractive power of the first lens unit L1 and the second lens unit L2 is configured to satisfy Condition (9), high optical performance can be easily obtained while the downsizing of the entire zoom lens and a high zoom ratio can be realized. When either the lower limit or the upper limit of Condition (9) is exceeded, the refractive power of the first lens unit L1 or the second lens unit L2 becomes too large, and, therefore, the aberration correction in the entire zooming area becomes difficult. Besides the above, when it is intended to obtain a desired zoom ratio, the entire zoom lens is increased in size.

Condition (10) defines the refractive power of the first lens unit L1. When the refractive power of the first lens unit L1 is configured to satisfy Condition (10), high optical performance can be easily obtained while the downsizing of the entire zoom lens can be realized. When the lower limit of Condition (10) is exceeded, the refractive power of the first lens unit L1 becomes too large, and the correction of spherical aberration and coma in the entire zooming area becomes difficult. In addition, the correction of axial chromatic aberration at the telephoto end becomes difficult. Meanwhile, when the upper limit is exceeded, the refractive power of the first lens unit L1 becomes too small, and the entire zoom lens is increased in size.

Condition (11) defines the refractive power of the second lens unit L2. When the refractive power of the second lens unit L2 is configured to satisfy Condition (11), high optical performance can be easily obtained while the downsizing of the entire zoom lens can be easily realized. When the lower limit of Condition (11) is exceeded, the refractive power of the second lens unit L2 becomes too large, and the correction of curvature of field and lateral chromatic aberration in the entire zooming area becomes difficult. Meanwhile, when the upper limit is exceeded, the refractive power of the second lens unit L2 becomes too small, and the entire zoom lens is increased in size.

In the exemplary embodiments, the numerical value ranges of conditions (4) to (11) are more favorably as follows:

$$0.12 < ZLR/Z < 0.33 \tag{4a}$$

$$13.0 < vd2p < 19.5 \tag{5a}$$

$$1.85 < nd2\text{ave} < 2.15 \tag{6a}$$

$$63.0 < vd1p < 96.0 \tag{7a}$$

$$1.43 < nd1p < 1.65 \tag{8a}$$

$$4.5 < |f1/f2| < 7.0 \tag{9a}$$

$$0.3 < f1/ft < 0.9 \tag{10a}$$

$$0.07 < |f2|/ft < 0.15 \tag{11a}$$

In the exemplary embodiments, the numerical value ranges of conditions (4a) to (11a) are more particularly favorably as follows:

$$0.15 < ZLR/Z < 0.30 \tag{4b}$$

$$15.0 < vd2p < 19.0 \tag{5b}$$

$$1.87 < nd2\text{ave} < 2.00 \tag{6b}$$

$$66.0 < vd1p < 90.0 \tag{7b}$$

$$1.46 < nd1p < 1.60 \quad (8b)$$

$$4.7 < |f1/f2| < 6.5 \quad (9b)$$

$$0.4 < f1/ft < 0.8 \quad (10b)$$

$$0.09 < |f2|/ft < 0.14 \quad (11b)$$

Each of the exemplary embodiments includes, in order from the object side to the image side, the first lens unit L1 having positive refractive power, the second lens unit L2 having negative refractive power, the reflecting unit UR, and the rear lens group including at least two lens units. Further, during zooming, at least the first lens unit L1 and the second lens unit L2 are moved, and the distance between every adjacent lens units is changed. Here, the reflecting unit UR is not moved during zooming.

Hereinafter, a zoom lens of the first exemplary embodiment of the present invention will be described with reference to FIG. 1. The lens of the first exemplary embodiment is a four-unit zoom lens including, in order from the object side to the image side, the first lens unit L1 to the fourth lens unit L4 respectively having positive, negative, positive, and positive refractive power. In the first exemplary embodiment, during zooming from the wide-angle end to the telephoto end, the reflecting unit UR for bending an optical path is not moved, the first and third lens units L1 and L3 are moved toward the object side, and the second lens unit L2 is moved toward the image side. The fourth lens unit L4 is nonlinearly moved.

The aperture stop SS is arranged in the third lens unit L3 and is moved integrally with the third lens unit L3. Further, the reflecting unit UR employs an internal reflection prism that uses total reflection or specular reflection. During zooming from the wide-angle end to the telephoto end, the third lens unit L3 is moved up to near an exit surface of the reflecting unit UR.

Accordingly, a high zoom ratio is realized while contribution to the zooming by the third lens unit L3 is increased and the downsizing of the optical system is realized. An image plane variation due to zooming is compensated by moving the fourth lens unit L4 in a nonlinear locus. As a focusing system from an infinite-distance object to a finite-distance object, a rear focusing system is employed in which the fourth lens unit L4 is moved on the optical axis.

Hereinafter, a zoom lens of the second exemplary embodiment of the present invention will be described with reference to FIG. 3. The zoom lens of the second exemplary embodiment is a five-unit zoom lens including, in order from the object side to the image side, a first lens unit L1 to a fifth lens unit L5 respectively having positive, negative, positive, negative, and positive refractive power.

In the second exemplary embodiment, during zooming from the wide-angle end to the telephoto end, the reflecting unit UR and the fourth lens unit L4 are not moved, the first and third lens units L1 and L3 are moved toward the object side, and the second lens unit L2 is moved toward the image side. The fifth lens unit L5 is nonlinearly moved. The aperture stop SS is arranged in the third lens unit L3 and is moved integrally with the third lens unit L3. Also, the reflecting unit UR employs a prism similar to the first exemplary embodiment.

During zooming from the wide-angle end to the telephoto end, the third lens unit L3 is moved up to near an exit surface of the reflecting unit UR. Accordingly, a high zoom ratio is realized while contribution to the zooming by the third lens unit L3 is increased and the downsizing of the optical system is realized. Further, by arranging the fourth lens unit L4 having negative refractive power between the third and fifth lens units L3 and L5, the positive refractive power of the fifth lens units L5 is increased and the contribution to the zooming and the focus sensitivity is increased.

An image plane variation due to zooming is compensated by moving the fifth lens unit L5 in a nonlinear locus. As a focusing system from an infinite-distance object to a finite-distance object, a rear focusing system is employed in which the fifth lens unit L5 is moved in the optical axis direction.

Hereinafter, a zoom lens of the third exemplary embodiment will be described with reference to FIG. 5. The lens of the third exemplary embodiment is a six-unit zoom lens including, in order from the object side to the image side, the first lens unit L1 to the sixth lens units L6 respectively having positive, negative, negative, positive, negative, and positive refractive power. In the third exemplary embodiment, during zooming from the wide-angle end to the telephoto end, the reflecting unit UR and the third and fifth lens units L3 and L5 are not moved, the first and fourth lens units L1 and L4 are moved toward the object side, and the second lens unit L2 is moved toward the image side. The aperture stop SS is arranged in the fourth lens unit L4 and is moved integrally with the fourth lens unit L4.

Further, the reflecting unit UR employs a prism similar to the first exemplary embodiment. By arranging the third lens unit L3 having negative refractive power closer to the image side than the reflecting unit UR, the positive refractive power of the fourth lens unit L4 is increased, whereby a high zoom ratio is realized while contribution to the zooming by the fourth lens unit L4 is increased and the downsizing of the optical system is realized.

An image plane variation due to zooming is compensated by moving the sixth lens unit L6 in a nonlinear locus. As a focusing system from an infinite-distance object to a finite-distance object, a rear focusing system is employed in which the sixth lens unit L6 is moved in the optical axis direction.

Hereinafter, a zoom lens of the fourth exemplary embodiment of the present invention will be described with reference to FIG. 7. In the fourth exemplary embodiment, the zooming type and the focusing system are similar to those in the third exemplary embodiment of FIG. 5. A difference from the third exemplary embodiment is that lens configurations in lens units are changed to realize a high zoom ratio. By using a low dispersion material having extraordinary partial dispersibility is used for the material of the positive lens of the first lens unit L1, chromatic aberration at the telephoto end that is increased due to a high zoom ratio is favorably corrected.

Hereinafter, a zoom lens of the fifth exemplary embodiment of the present invention will be described with reference to FIG. 9. In the fifth exemplary embodiment, the zooming type and the focusing system are similar to those in the third exemplary embodiment of FIG. 5. A difference from the third exemplary embodiment is that lens configurations in lens units are changed to realize a wide angle and a high zoom ratio. By appropriately setting the amounts of movement of the first and second lens units L1 and L2 during zooming, various aberrations, such as a variation of curvature of field, are favorably corrected and a high zoom ratio is realized while an increase in the front lens effective diameter in a wide angle is suppressed.

In the schematic configuration diagrams of FIGS. 11A and 11B of a digital still camera (an image pickup apparatus) that includes a zoom lens according to the exemplary embodiments of the present invention, FIG. 11A illustrates an image-capturing state and FIG. 11B illustrates a stored state (retracted state) of the zoom lens when not capturing an image. The zoom lens in FIGS. 11A and 11B is illustrated as an example of the zoom lens of the third exemplary embodiment. In FIGS. 11A and 11B, the first lens unit having positive refractive power is represented by L1 and the second lens unit having negative refractive power is represented by L2.

A reflecting unit UR includes a reflection surface for bending the optical path, and is made of a prism using an in-plane reflection in FIGS. 11A and 11B. A rear lens group LR includes two or more lens units and an aperture stop SS closer to the image side than the reflecting unit UR. The rear lens group LR includes the third lens unit L3 having negative refractive power, the fourth lens unit L4 having positive refractive power, the fifth lens unit L5 having negative refractive power, and the sixth lens unit L6 having positive refractive power. The aperture stop SS is arranged between lenses of the fourth lens unit L4. A solid-state image sensor (photoelectric conversion element) IP, such as a CCD sensor and a CMOS sensor, receives an image formed by the zoom lens.

In the exemplary embodiments, when the zoom lens is moved from an image-capturing state (FIG. 11A) to a stored state (FIG. 11B), the reflecting unit UR is moved toward the image side on the optical axis. Along with that, the first and second lens units L1 and L2 are moved to a space side caused by the movement of the reflecting unit UR, and are stored there in a retracted manner. By employing such a retractable and optical-path-bending zoom lens, the thinning of the camera in the front and rear direction can be easily realized.

While the exemplary embodiments of the present invention have been described, the invention is not limited to the disclosed exemplary embodiments, and various modifications and changes can be made within the scope of the invention. For example, the zoom lenses in the first to fifth exemplary embodiments may control a stop diameter according to a zoom position to control a variation of the F-number during zooming.

Further, distortion remaining in the entire zoom lens may be electrically corrected (by image processing). Further, by moving all or a part of the lens units included in the entire zoom lens in a direction having a component perpendicular to the optical axis, an image forming position may be moved in a direction perpendicular to the optical axis. That is, correction of camera shake may be performed. In this case, to prevent interference with the reflecting unit, it is favorable to employ an image stabilization lens unit for the lens units closer to the image side than the third lens unit L3 in the first and second exemplary embodiments, and for the lens units closer to the image side than the fourth lens unit L4 in the third to fifth exemplary embodiments. A camera shake correction method may also be used by moving the image sensor.

Next, an exemplary embodiment of a digital camera (optical apparatus) will be described, in which a zoom lens according to the exemplary embodiments of the present invention is used as a photographic optical system. FIG. 12 illustrates a digital camera body 20, a photographic optical system 21 including a zoom lens of the above-described exemplary embodiments, and a reflecting unit P. The photographic optical system 21 forms an image of an object on a solid-state image sensor (on a photoelectric conversion element) 22, such as a CCD sensor. A recording unit 23 records the image of the object received by the image sensor 22, and a viewfinder 24 is used for observing the image displayed on a display element (not illustrated). The display element includes a liquid crystal panel, and the like, on which the image formed on the image sensor 22 is displayed.

By applying the zoom lens according to the exemplary embodiments of the present invention to a digital camera, and the like in this way, a small-sized image pickup apparatus having high optical performance is realized.

Hereinafter, specific numerical data of numerical examples 1 to 5 corresponding to the first to fifth exemplary embodiments will be listed. In each numerical example, i represents a number of a surface counted from the object side. A radius of curvature of the i-th optical surface (i-th surface) is represented by ri. A distance between the i-th surface and the (i+1)-th surface on the axis (axial distance) is represented by di. A refractive index and the Abbe number of a material of the i-th optical member at the d-line are respectively represented by ndi and νdi. A photographic angle of view is indicated by a half angle of view (degree). Here, the Abbe number νd is expressed in the following expression:

$$\nu d = (Nd-1)/(NF-NC)$$

Here, the refractive index at the d-line of Fraunhofer (wavelength 587.6 nm) is Nd, the refractive index at the F-line of Fraunhofer (wavelength 486.1 nm) is NF, and the refractive index at the C-line of Fraunhofer (wavelength 656.3 nm) is NC. Four surfaces at the image plane side indicate optical blocks, such as optical filters.

Where present, aspheric surfaces are denoted by an asterisk ("*") added next to the surface number. An aspheric surface is expressed in the following expression:

$$X = (h^2/r)/[1+\{1-(1+K)\times(h/r)2\}^{1/2}] + A4 \times h^4 + A6 \times h^6 + A8 \times h^8 + A10 \times h^{10}$$

where a traveling direction of light is positive, an amount of displacement from a surface vertex in the optical axis direction is x, a height from the optical axis in a direction perpendicular to the optical axis is h, a paraxial radius of curvature is r, a conic constant is K, and aspheric coefficients are A4, A6, A8, and A10. Note that the numerical value of "e±XX" means "×10^{±XX}". Further the relationship between the above-described conditions and the numerical examples are listed in Table 1.

Numerical Example 1

| | Unit: mm Surface data | | | | |
|---|---|---|---|---|---|
| Surface number | r | d | nd | vd | Effective diameter |
| 1 | 37.537 | 1.10 | 1.84666 | 23.8 | 24.74 |
| 2 | 22.470 | 4.00 | 1.49700 | 81.5 | 22.42 |
| 3 | 228.496 | 0.10 | | | 21.03 |
| 4 | 25.888 | 2.40 | 1.77250 | 49.6 | 20.22 |
| 5 | 124.990 | (Variable) | | | 19.86 |
| 6* | −435.582 | 1.05 | 1.85135 | 40.1 | 13.81 |
| 7* | 6.547 | 3.81 | | | 9.89 |
| 8 | −14.224 | 0.60 | 1.88300 | 40.8 | 9.50 |
| 9 | 49.116 | 0.10 | | | 9.64 |
| 10 | 22.089 | 1.50 | 2.10205 | 16.8 | 9.78 |
| 11 | −79.831 | (Variable) | | | 9.71 |
| 12 | ∞ | 8.50 | 1.83400 | 37.2 | 7.64 |
| 13 | ∞ | (Variable) | | | 6.40 |
| 14* | 9.864 | 2.30 | 1.55332 | 71.7 | 7.90 |
| 15* | 1571.669 | 1.00 | | | 7.70 |
| 16 (Stop) | ∞ | 1.00 | | | 6.10 |
| 17 | 12.036 | 0.60 | 1.84666 | 23.8 | 5.92 |
| 18 | 8.538 | 1.71 | | | 5.70 |
| 19 | 49.260 | 2.10 | 1.48749 | 70.2 | 7.20 |
| 20 | −9.072 | 0.60 | 1.88300 | 40.8 | 7.20 |
| 21 | −14.067 | (Variable) | | | 7.10 |
| 22 | 16.357 | 1.45 | 1.48749 | 70.2 | 9.31 |
| 23 | −227.600 | 0.70 | 1.84666 | 23.8 | 9.22 |
| 24 | 101.004 | (Variable) | | | 9.14 |
| 25 | ∞ | 0.30 | 1.51633 | 64.1 | 20.00 |
| 26 | ∞ | 1.60 | | | 20.00 |

-continued

| | | | | | |
|---|---|---|---|---|---|
| 27 | ∞ | 0.50 | 1.51633 | 64.1 | 20.00 |
| 28 | ∞ | | | | 20.00 |
| Image plane | ∞ | | | | |

Aspheric surface data

Sixth surface

K = −4.74765e+002
A4 = 2.18876e−005

Seventh surface

K = 2.15394e−002
A4 = −6.54389e−005

Fourteenth surface

K = −1.47175e+000
A4 = 1.03780e−004
A6 = 7.69273e−007
A8 = 1.06577e−008

Fifteenth surface

K = 1.78907e+005
A4 = 2.60764e−005

Various data
Zoom ratio 13.99

| | Wide angle | Middle | Telephoto |
|---|---|---|---|
| Focal length | 5.00 | 25.18 | 69.97 |
| F-number | 3.50 | 5.07 | 5.74 |
| Half angle of view (degree) | 34.29 | 8.75 | 3.17 |
| Image height | 3.41 | 3.88 | 3.88 |
| Total lens length | 80.92 | 87.98 | 94.30 |
| BF | 0.50 | 0.50 | 0.50 |
| d5 | 0.80 | 13.48 | 20.80 |
| d11 | 7.42 | 1.79 | 0.80 |
| d13 | 18.50 | 3.20 | 0.50 |
| d21 | 10.75 | 16.37 | 29.64 |
| d24 | 5.94 | 15.62 | 5.05 |
| Entrance pupil position | 15.92 | 58.87 | 156.68 |
| Exit pupil position | −32.66 | −56.65 | −122.26 |
| Front principal point position | 20.17 | 72.95 | 186.77 |
| Rear principal point position | −4.50 | −24.68 | −69.47 |

Zoom lens unit data

| Unit | Start surface | Focal length | Lens configuration length | Front principal point position | Rear principal point position |
|---|---|---|---|---|---|
| L1 | 1 | 35.39 | 7.60 | 1.99 | −2.80 |
| L2 | 6 | −6.66 | 7.06 | 0.73 | −4.83 |
| UR | 12 | ∞ | 8.50 | 2.32 | −2.32 |
| L3 | 14 | 18.09 | 9.31 | 1.73 | −6.49 |
| L4 | 22 | 49.45 | 2.15 | −0.64 | −1.97 |
| G | 25 | ∞ | 2.40 | 1.06 | −1.06 |

Single lens data

| Lens | Start surface | Focal length |
|---|---|---|
| 1 | 1 | −68.41 |
| 2 | 2 | 49.82 |
| 3 | 4 | 41.83 |
| 4 | 6 | −7.57 |
| 5 | 8 | −12.44 |
| 6 | 10 | 15.82 |
| 7 | 12 | 0.00 |
| 8 | 14 | 17.93 |
| 9 | 17 | −37.67 |
| 10 | 19 | 15.90 |
| 11 | 20 | −30.66 |
| 12 | 22 | 31.37 |
| 13 | 23 | −82.55 |
| 14 | 25 | 0.00 |
| 15 | 27 | 0.00 |

Numerical Example 2

Unit: mm
Surface data

| Surface number | r | d | nd | vd | Effective diameter |
|---|---|---|---|---|---|
| 1 | 36.494 | 1.10 | 1.84666 | 23.8 | 23.47 |
| 2 | 21.159 | 3.60 | 1.48749 | 70.2 | 21.18 |
| 3 | 150.416 | 0.10 | | | 19.93 |
| 4 | 25.465 | 2.20 | 1.77250 | 49.6 | 17.39 |
| 5 | 155.076 | (Variable) | | | 16.79 |
| 6* | −90.487 | 1.05 | 1.85135 | 40.1 | 13.64 |
| 7* | 6.318 | 3.93 | | | 9.87 |
| 8 | −11.900 | 0.60 | 1.88300 | 40.8 | 9.64 |
| 9 | −102.709 | 0.10 | | | 9.98 |
| 10 | 32.503 | 1.60 | 1.94595 | 18.0 | 10.20 |
| 11 | −30.670 | (Variable) | | | 10.21 |
| 12 | ∞ | 8.50 | 1.83400 | 37.2 | 8.40 |
| 13 | ∞ | (Variable) | | | 7.08 |
| 14* | 9.635 | 2.30 | 1.55332 | 71.7 | 7.90 |
| 15* | −65.191 | 1.00 | | | 7.70 |
| 16 (Stop) | ∞ | 1.00 | | | 6.89 |
| 17 | 10.943 | 0.60 | 1.84666 | 23.8 | 6.55 |
| 18 | 7.785 | 1.06 | | | 6.25 |
| 19 | −1787.869 | 2.10 | 1.48749 | 70.2 | 7.20 |
| 20 | −7.785 | 0.60 | 1.88300 | 40.8 | 7.20 |
| 21 | −12.079 | (Variable) | | | 7.10 |
| 22 | −54.003 | 0.70 | 1.48749 | 70.2 | 8.47 |
| 23 | 59.655 | (Variable) | | | 8.59 |
| 24 | 14.383 | 2.40 | 1.51633 | 64.1 | 9.75 |
| 25 | −24.673 | 0.70 | 1.84666 | 23.8 | 9.63 |
| 26 | −51.610 | (Variable) | | | 9.62 |
| 27 | ∞ | 0.30 | 1.51633 | 64.1 | 20.00 |
| 28 | ∞ | 1.60 | | | 20.00 |
| 29 | ∞ | 0.50 | 1.51633 | 64.1 | 20.00 |
| 30 | ∞ | | | | 20.00 |
| Image plane | ∞ | | | | |

Aspheric surface data

Sixth surface

K = −5.84572e+002
A4 = 5.80292e−006

Seventh surface

K = −2.06745e−001
A4 = 2.32185e−005

Fourteenth surface

K = −1.48996e+000
A4 = 1.03367e−004
A6 = 8.33874e−007
A8 = −1.69131e−008

Fifteenth surface

K = 2.27950e+001
A4 = 5.55581e−005

Various data
Zoom ratio 12.00

|  | Wide angle | Middle | Telephoto |
|---|---|---|---|
| Focal length | 5.00 | 21.13 | 60.00 |
| F-number | 3.03 | 4.80 | 5.74 |
| Half angle of view (degree) | 34.29 | 10.39 | 3.70 |
| Image height | 3.41 | 3.88 | 3.88 |
| Total lens length | 80.01 | 85.91 | 93.43 |
| BF | 0.50 | 0.50 | 0.50 |
| d5 | 0.92 | 10.89 | 19.42 |
| d11 | 5.87 | 1.81 | 0.80 |
| d13 | 19.68 | 4.25 | 0.40 |
| d21 | 4.27 | 19.69 | 23.55 |
| d23 | 5.31 | 4.21 | 7.97 |
| d26 | 5.81 | 6.91 | 3.15 |
| Entrance pupil position | 15.14 | 41.86 | 112.78 |
| Exit pupil position | −38.65 | −155.17 | 428.81 |
| Front principal point position | 19.50 | 60.12 | 181.19 |
| Rear principal point position | −4.50 | −20.63 | −59.50 |

Zoom lens unit data

| Unit | Start surface | Focal length | Lens configuration length | Front principal point position | Rear principal point position |
|---|---|---|---|---|---|
| L1 | 1 | 35.57 | 7.00 | 1.92 | −2.50 |
| L2 | 6 | −7.06 | 7.28 | 0.23 | −5.98 |
| UR | 12 | ∞ | 8.50 | 2.32 | −2.32 |
| L3 | 14 | 17.05 | 8.66 | 0.94 | −6.34 |
| L4 | 22 | −58.03 | 0.70 | 0.22 | −0.25 |
| L5 | 24 | 25.91 | 3.10 | 0.29 | −1.70 |
| G | 27 | ∞ | 2.40 | 1.06 | −1.06 |

Single lens data

| Lens | Start surface | Focal length |
|---|---|---|
| 1 | 1 | −61.49 |
| 2 | 2 | 50.05 |
| 3 | 4 | 39.15 |
| 4 | 6 | −6.90 |
| 5 | 8 | −15.29 |
| 6 | 10 | 16.89 |
| 7 | 12 | 0.00 |
| 8 | 14 | 15.34 |
| 9 | 17 | −34.91 |
| 10 | 19 | 16.03 |
| 11 | 20 | −26.54 |
| 12 | 22 | −58.03 |
| 13 | 24 | 17.97 |
| 14 | 25 | −56.51 |
| 15 | 27 | 0.00 |
| 16 | 29 | 0.00 |

Numerical Example 3

Unit: mm
Surface data

| Surface number | r | d | nd | vd | Effective diameter |
|---|---|---|---|---|---|
| 1 | 31.211 | 1.20 | 1.84666 | 23.8 | 24.07 |
| 2 | 18.915 | 3.80 | 1.48749 | 70.2 | 21.78 |
| 3 | 61.786 | 0.10 |  |  | 20.87 |
| 4 | 22.255 | 2.50 | 1.80400 | 46.6 | 19.47 |
| 5 | 68.349 | (Variable) |  |  | 18.58 |
| 6 | 124.117 | 1.10 | 1.86400 | 40.6 | 13.51 |
| 7* | 6.120 | 3.69 |  |  | 9.66 |
| 8 | −12.724 | 0.60 | 1.88300 | 40.8 | 9.38 |
| 9 | 31.914 | 0.10 |  |  | 9.60 |
| 10 | 19.146 | 2.20 | 1.92286 | 18.9 | 9.79 |
| 11 | −25.465 | (Variable) |  |  | 9.79 |
| 12 | ∞ | 8.30 | 1.83400 | 37.2 | 7.31 |
| 13 | ∞ | 0.65 |  |  | 6.14 |
| 14 | −32.304 | 0.65 | 1.77250 | 49.6 | 6.26 |
| 15 | −71.317 | (Variable) |  |  | 6.42 |
| 16* | 9.698 | 2.00 | 1.55332 | 71.7 | 6.74 |
| 17* | −34.923 | 1.05 |  |  | 6.68 |
| 18 (Stop) | ∞ | 1.05 |  |  | 6.46 |
| 19 | 11.960 | 0.60 | 1.84666 | 23.8 | 6.21 |
| 20 | 7.799 | 1.73 |  |  | 5.95 |
| 21 | 14.439 | 2.30 | 1.48749 | 70.2 | 6.04 |
| 22 | −8.615 | 0.60 | 1.88300 | 40.8 | 5.89 |
| 23 | −13.793 | (Variable) |  |  | 5.96 |
| 24 | −26.877 | 0.80 | 1.60311 | 60.6 | 5.52 |
| 25 | 14.902 | (Variable) |  |  | 5.65 |
| 26* | 16.023 | 2.80 | 1.48749 | 70.2 | 9.59 |
| 27 | −13.562 | (Variable) |  |  | 9.69 |
| 28 | ∞ | 0.30 | 1.51633 | 64.1 | 20.00 |
| 29 | ∞ | 1.60 |  |  | 20.00 |
| 30 | ∞ | 0.50 | 1.51633 | 64.1 | 20.00 |
| 31 | ∞ |  |  |  | 20.00 |
| Image plane | ∞ |  |  |  |  |

Aspheric surface data

Seventh surface

K = 0.00000e+000
A4 = −7.77580e−005
A6 = −5.36969e−006
A8 = 1.98554e−007
A10 = −7.94713e−009

Sixteenth surface

K = −1.70486e−001
A4 = −6.91831e−005
A6 = −2.28800e−006
A8 = 2.08666e−008

Seventeenth surface

K = −4.92141e+001
A4 = −5.60099e−005

Twenty-sixth surface

K = 0.00000e+000
A4 = −1.27581e−004
A6 = −4.76135e−008
A8 = −3.49285e−009 various data
Zoom ratio 11.48

|  | Wide angle | Middle | Telephoto |
|---|---|---|---|
| Focal length | 4.61 | 28.64 | 52.91 |
| F-number | 3.00 | 5.38 | 6.06 |
| Half angle of view (degree) | 35.87 | 7.71 | 4.19 |
| Image height | 3.33 | 3.88 | 3.88 |
| Total lens length | 75.32 | 86.29 | 90.11 |
| BF | 0.50 | 0.50 | 0.50 |
| d5 | 0.83 | 16.09 | 20.87 |
| d11 | 6.04 | 1.74 | 0.79 |
| d15 | 13.19 | 2.12 | 0.30 |
| d23 | 1.11 | 12.18 | 13.99 |
| d25 | 4.83 | 10.31 | 11.49 |
| d27 | 8.56 | 3.08 | 1.90 |
| Entrance pupil position | 15.61 | 68.55 | 115.15 |
| Exit pupil position | −50.10 | 63.27 | 50.68 |

-continued

| | | | | |
|---|---|---|---|---|
| Front principal point position | 19.80 | 110.26 | 223.83 | |
| Rear principal point position | −4.11 | −28.14 | −52.41 | |

Zoom lens unit data

| Unit | Start surface | Focal length | Lens configuration length | Front principal point position | Rear principal point position |
|---|---|---|---|---|---|
| L1 | 1 | 40.20 | 7.60 | 1.15 | −3.57 |
| L2 | 6 | −7.28 | 7.69 | 0.36 | −6.01 |
| UR | 12 | ∞ | 8.35 | 2.28 | −2.28 |
| L3 | 14 | −77.00 | 0.65 | −0.31 | −0.68 |
| L4 | 16 | 12.83 | 9.33 | 2.67 | −5.99 |
| L5 | 24 | −15.78 | 0.80 | 0.32 | −0.18 |
| L6 | 26 | 15.55 | 2.80 | 1.05 | −0.89 |
| G | 28 | ∞ | 2.40 | 1.06 | −1.06 |

Single lens data

| Lens | Start surface | Focal length |
|---|---|---|
| 1 | 1 | −59.36 |
| 2 | 2 | 54.34 |
| 3 | 4 | 40.08 |
| 4 | 6 | −7.48 |
| 5 | 8 | −10.24 |
| 6 | 10 | 12.13 |
| 7 | 12 | 0.00 |
| 8 | 14 | −77.00 |
| 9 | 16 | 13.94 |
| 10 | 19 | −28.35 |
| 11 | 21 | 11.44 |
| 12 | 22 | −27.48 |
| 13 | 24 | −15.78 |
| 14 | 26 | 15.55 |
| 15 | 28 | 0.00 |
| 16 | 30 | 0.00 |

Numerical Example 4

Unit: mm
Surface data

| Surface number | r | d | nd | vd | Effective diameter |
|---|---|---|---|---|---|
| 1 | 39.596 | 1.10 | 1.84666 | 23.8 | 23.24 |
| 2 | 23.031 | 3.50 | 1.49700 | 81.5 | 21.12 |
| 3 | 625.806 | 0.10 | | | 20.01 |
| 4 | 25.649 | 2.20 | 1.77250 | 49.6 | 19.33 |
| 5 | 115.465 | (Variable) | | | 19.00 |
| 6* | 105.096 | 1.05 | 1.86400 | 40.6 | 13.06 |
| 7* | 6.071 | 3.50 | | | 9.43 |
| 8 | −11.502 | 0.60 | 1.88300 | 40.8 | 9.23 |
| 9 | 84.927 | 0.10 | | | 9.49 |
| 10 | 21.649 | 1.80 | 1.94595 | 18.0 | 9.69 |
| 11 | −29.617 | (Variable) | | | 9.67 |
| 12 | ∞ | 7.50 | 1.83400 | 37.2 | 7.42 |
| 13 | ∞ | 0.80 | | | 6.50 |
| 14 | −18.249 | 0.60 | 1.88300 | 40.8 | 6.60 |
| 15 | −28.718 | (Variable) | | | 6.80 |
| 16* | 9.863 | 2.30 | 1.55332 | 71.7 | 7.90 |
| 17* | −36.227 | 1.00 | | | 7.70 |
| 18 (Stop) | ∞ | 1.00 | | | 6.92 |
| 19 | 10.797 | 0.60 | 1.84666 | 23.8 | 6.63 |
| 20 | 7.747 | 1.30 | | | 6.33 |
| 21 | 78.337 | 2.10 | 1.48749 | 70.2 | 7.20 |
| 22 | −9.415 | 0.60 | 1.83481 | 42.7 | 7.20 |
| 23 | −13.771 | (Variable) | | | 7.10 |
| 24 | 142.265 | 0.70 | 1.91082 | 35.3 | 7.82 |
| 25 | 30.646 | (Variable) | | | 7.85 |
| 26 | 15.005 | 2.00 | 1.48749 | 70.2 | 10.12 |
| 27 | −65.156 | (Variable) | | | 10.03 |
| 28 | ∞ | 0.30 | 1.51633 | 64.1 | 20.00 |
| 29 | ∞ | 1.60 | | | 20.00 |
| 30 | ∞ | 0.50 | 1.51633 | 64.1 | 20.00 |
| 31 | ∞ | | | | 20.00 |
| Image plane | ∞ | | | | |

Aspheric surface data

Sixth surface

K = −1.01105e+001
A4 = −3.26513e−005

Seventh surface

K = −1.55025e−001
A4 = −1.81949e−005

Sixteenth surface

K = −1.59635e+000
A4 = 1.11561e−004
A6 = 1.67477e−007
A8 = −2.76827e−009

Seventeenth surface

K = 1.50590e+001
A4 = 1.46714e−004

Various data
Zoom ratio 14.58

| | Wide angle | Middle | Telephoto |
|---|---|---|---|
| Focal length | 5.12 | 17.36 | 74.72 |
| F-number | 3.25 | 4.59 | 5.72 |
| Half angle of view (degree) | 33.64 | 12.58 | 2.97 |
| Image height | 3.41 | 3.88 | 3.88 |
| Total lens length | 78.41 | 84.25 | 94.41 |
| BF | 0.50 | 0.50 | 0.50 |
| d5 | 0.64 | 9.44 | 20.64 |
| d11 | 5.00 | 2.04 | 1.00 |
| d15 | 16.44 | 4.96 | 0.50 |
| d23 | 0.95 | 12.43 | 16.89 |
| d25 | 11.81 | 8.93 | 13.41 |
| d27 | 6.22 | 9.10 | 4.62 |
| Entrance pupil position | 14.64 | 37.40 | 154.59 |
| Exit pupil position | −66.46 | −166.69 | 228.17 |
| Front principal point position | 19.37 | 52.96 | 253.83 |
| Rear principal point position | −4.62 | −16.86 | −74.22 |

Zoom lens unit data

| Unit | Start surface | Focal length | Lens configuration length | Front principal point position | Rear principal point position |
|---|---|---|---|---|---|
| L1 | 1 | 34.87 | 6.90 | 1.83 | −2.50 |
| L2 | 6 | −7.27 | 7.05 | 0.39 | −5.42 |
| UR | 12 | ∞ | 7.50 | 2.04 | −2.04 |
| L3 | 14 | −58.26 | 0.60 | −0.57 | −0.90 |
| L4 | 16 | 14.64 | 8.90 | 1.56 | −6.15 |
| L5 | 24 | −43.01 | 0.70 | 0.47 | 0.10 |
| L6 | 26 | 25.22 | 2.00 | 0.25 | −1.10 |
| G | 28 | ∞ | 2.40 | 1.06 | −1.06 |

Single lens data

| Lens | Start surface | Focal length |
|---|---|---|
| 1 | 1 | −67.06 |
| 2 | 2 | 48.02 |

-continued

| | | |
|---|---|---|
| 3 | 4 | 42.23 |
| 4 | 6 | -7.49 |
| 5 | 8 | -11.44 |
| 6 | 10 | 13.45 |
| 7 | 12 | 0.00 |
| 8 | 14 | -58.26 |
| 9 | 16 | 14.26 |
| 10 | 19 | -35.61 |
| 11 | 21 | 17.38 |
| 12 | 22 | -38.03 |
| 13 | 24 | -43.01 |
| 14 | 26 | 25.22 |
| 15 | 28 | 0.00 |
| 16 | 30 | 0.00 |

Numerical Example 5

Unit: mm
Surface data

| Surface number | r | d | nd | vd | Effective diameter |
|---|---|---|---|---|---|
| 1 | 38.533 | 1.10 | 1.84666 | 23.8 | 25.15 |
| 2 | 23.129 | 3.30 | 1.48749 | 70.2 | 23.19 |
| 3 | 108.394 | 0.10 | | | 22.53 |
| 4 | 30.124 | 2.40 | 1.77250 | 49.6 | 21.71 |
| 5 | 176.189 | (Variable) | | | 21.43 |
| 6 | 151.976 | 1.05 | 1.85135 | 40.1 | 14.55 |
| 7* | 6.659 | 3.84 | | | 10.35 |
| 8 | -14.597 | 0.65 | 1.88300 | 40.8 | 10.02 |
| 9 | 21.930 | 0.20 | | | 10.14 |
| 10 | 17.534 | 2.00 | 1.94595 | 18.0 | 10.36 |
| 11 | -35.574 | (Variable) | | | 10.33 |
| 12 | ∞ | 7.15 | 1.83400 | 37.2 | 6.21 |
| 13 | ∞ | 0.48 | | | 6.66 |
| 14 | -30.246 | 0.60 | 1.88300 | 40.8 | 6.74 |
| 15 | -56.670 | (Variable) | | | 6.91 |
| 16* | 8.780 | 2.15 | 1.55332 | 71.7 | 7.36 |
| 17* | -121.803 | 1.02 | | | 7.22 |
| 18 (Stop) | ∞ | 1.02 | | | 7.04 |
| 19 | 11.059 | 0.61 | 1.84666 | 23.8 | 6.77 |
| 20 | 8.171 | 1.30 | | | 6.48 |
| 21 | 13.168 | 3.55 | 1.48749 | 70.2 | 6.63 |
| 22 | -6.016 | 0.60 | 1.88300 | 40.8 | 6.58 |
| 23 | -11.950 | (Variable) | | | 6.85 |
| 24 | -130.666 | 0.70 | 1.48749 | 70.2 | 6.06 |
| 25 | 8.359 | (Variable) | | | 6.04 |
| 26* | 12.331 | 3.50 | 1.48749 | 70.2 | 10.52 |
| 27 | -24.656 | (Variable) | | | 10.37 |
| 28 | ∞ | 0.30 | 1.51633 | 64.1 | 20.00 |
| 29 | ∞ | 1.60 | | | 20.00 |
| 30 | ∞ | 0.50 | 1.51633 | 64.1 | 20.00 |
| 31 | ∞ | | | | 20.00 |
| Image plane | ∞ | | | | |

Aspheric surface data

Seventh surface

K = 7.67669e-002
A4 = -1.04295e-004
A6 = -1.91570e-006
A8 = 1.31689e-009
A10 = -1.22263e-009

Sixteenth surface

K = 1.97782e-001
A4 = -7.19392e-005
A6 = 7.10755e-008
A8 = -1.48419e-008

Seventeenth surface

K = -1.36483e+002
A4 = 9.64577e-005

Twenty-sixth surface

K = 0.00000e+000
A4 = -6.87779e-006
A6 = 9.74986e-007
A8 = -3.24927e-008
A10 = 4.15930e-010

Various data
Zoom ratio 15.34

| | Wide angle | Middle | Telephoto |
|---|---|---|---|
| Focal length | 4.42 | 29.69 | 67.77 |
| F-number | 3.16 | 5.15 | 5.85 |
| Half angle of view (degree) | 37.02 | 7.44 | 3.27 |
| Image height | 3.33 | 3.88 | 3.88 |
| Total lens length | 80.92 | 90.09 | 95.30 |
| BF | 0.50 | 0.50 | 0.50 |
| d5 | 0.51 | 19.24 | 25.51 |
| d11 | 11.57 | 2.01 | 0.95 |
| d15 | 13.30 | 3.65 | 0.35 |
| d23 | 0.78 | 10.44 | 13.73 |
| d25 | 7.60 | 11.12 | 11.61 |
| d27 | 6.92 | 3.40 | 2.91 |
| Entrance pupil position | 14.38 | 79.53 | 154.49 |
| Exit pupil position | -70.16 | 117.84 | 86.19 |
| Front principal point position | 18.52 | 116.72 | 275.87 |
| Rear principal point position | -3.92 | -29.19 | -67.27 |

Zoom lens unit data

| Unit | Start surface | Focal length | Lens configuration length | Front principal point position | Rear principal point position |
|---|---|---|---|---|---|
| L1 | 1 | 43.29 | 6.90 | 1.51 | -2.81 |
| L2 | 6 | -7.20 | 7.75 | 0.63 | -5.65 |
| UR | 12 | ∞ | 7.15 | 1.95 | -1.95 |
| L3 | 14 | -74.26 | 0.60 | -0.37 | -0.69 |
| L4 | 16 | 12.79 | 10.26 | 2.18 | -6.72 |
| L5 | 24 | -16.08 | 0.70 | 0.44 | -0.03 |
| L6 | 26 | 17.40 | 3.50 | 0.81 | -1.62 |
| G | 28 | ∞ | 2.40 | 1.06 | -1.06 |

Single lens data

| Lens | Start surface | Focal length |
|---|---|---|
| 1 | 1 | -70.65 |
| 2 | 2 | 59.56 |
| 3 | 4 | 46.70 |
| 4 | 6 | -8.21 |
| 5 | 8 | -9.84 |
| 6 | 10 | 12.65 |
| 7 | 12 | 0.00 |
| 8 | 14 | -74.26 |
| 9 | 16 | 14.89 |
| 10 | 19 | -40.93 |
| 11 | 21 | 9.02 |
| 12 | 22 | -14.40 |
| 13 | 24 | -16.08 |
| 14 | 26 | 17.40 |
| 15 | 28 | 0.00 |
| 16 | 30 | 0.00 |

TABLE 1

| Condition | Lower limit | Upper limit | Numerical example 1 | 2 | 3 | 4 | 5 |
|---|---|---|---|---|---|---|---|
| (1) | 0.42 | 1.00 | 0.466 | 0.431 | 0.510 | 0.449 | 0.583 |
| (2) | 0.50 | 5.00 | 1.147 | 1.326 | 1.448 | 1.828 | 0.949 |
| (3) | 0.36 | 3.00 | 0.571 | 0.698 | 0.712 | 0.831 | 0.476 |
| (4) | 0.10 | 0.35 | 0.180 | 0.255 | 0.288 | 0.169 | 0.222 |
| (5) | 10.00 | 20.00 | 16.77 | 17.98 | 18.90 | 17.98 | 17.98 |
| (6) | 1.83 | 2.30 | 1.945 | 1.893 | 1.890 | 1.898 | 1.893 |
| (7) | 60.00 | 100.00 | 81.54 | 70.23 | 70.23 | 81.54 | 70.23 |
| (8) | 1.40 | 1.70 | 1.497 | 1.487 | 1.487 | 1.497 | 1.487 |
| (9) | 4.30 | 8.00 | 5.312 | 5.035 | 5.522 | 4.793 | 6.012 |
| (10) | 0.20 | 1.00 | 0.505 | 0.593 | 0.760 | 0.467 | 0.639 |
| (11) | 0.05 | 0.16 | 0.095 | 0.118 | 0.138 | 0.097 | 0.106 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-188586 filed Aug. 29, 2012, which is hereby incorporated by reference herein in its entirety.

What is claimed is:

1. A zoom lens comprising, in order from an object side to an image side:
a first lens unit having positive refractive power;
a second lens unit having negative refractive power;
a reflecting unit for bending an optical path; and
a rear lens group including two or more lens units,
wherein, during zooming, the first lens unit and the second lens unit are moved and the reflecting unit is not moved, and
wherein the following conditions are satisfied:

$$0.42 < (d2w - X1)/DR < 1.00$$

$$0.50 < |X1|/d2w < 5.00$$

$$0.36 < |f2|/d2w < 3.00,$$

where an amount of movement of the first lens unit during zooming from a wide-angle end to a telephoto end is X1, a distance from a reflection surface of the reflecting unit to an image plane on an optical axis is DR, a distance on the optical axis from a lens surface of the second lens unit closest to the image side to the reflection surface of the reflecting unit at the wide-angle end is d2w, and a focal length of the second lens unit is f2.

2. The zoom lens according to claim 1, wherein the following condition is satisfied:

$$0.10 < ZLR/Z < 0.35,$$

where
ZLR = βLRt/βLRw, and
Z = ft/fw
where βLRt is a composite lateral magnification of the rear lens group during focusing on an infinite-distance object at the telephoto end, βLRw is a composite lateral magnification of the rear lens group during focusing on an infinite-distance object at the wide-angle end, ft is a focal length of the entire zoom lens at the telephoto end, and fw is a focal length of the entire zoom lens at the wide-angle end.

3. The zoom lens according to claim 1, wherein the following condition is satisfied:

$$10.0 < vd2p < 20.0,$$

where vd2p is an Abbe number of a material of a positive lens having the smallest Abbe number among positive lenses constituting the second lens unit.

4. The zoom lens according to claim 1, wherein the following condition is satisfied:

$$1.83 < nd2ave < 2.30,$$

where nd2ave is an average refractive index of materials of lenses constituting the second lens unit.

5. The zoom lens according to claim 1, wherein the following conditions are satisfied:

$$60.0 < vd1p < 100.0$$

$$1.40 < nd1p < 1.70,$$

where an Abbe number and a refractive index of a material of a positive lens having the largest Abbe number among positive lenses constituting the first lens unit are vd1p and n1dp, respectively.

6. The zoom lens according to claim 1, wherein the following condition is satisfied:

$$4.3 < f1/|f2| < 8.0$$

where f1 is a focal length of the first lens unit.

7. The zoom lens according to claim 1, wherein the following condition is satisfied:

$$0.2 < f1/ft < 1.0$$

where f1 is a focal length of the first lens unit, and ft is a focal length of the entire zoom lens at the telephoto end.

8. The zoom lens according to claim 1, wherein the following condition is satisfied:

$$0.05 < |f2|/ft < 0.16$$

where ft is a focal length of the entire zoom lens at the telephoto end.

9. The zoom lens according to claim 1, wherein at least a part of the first lens unit and the second lens unit is moved to a space formed by movement of the reflecting unit during retraction of the zoom lens.

10. The zoom lens according to claim 1, wherein the rear lens group includes an aperture stop.

11. The zoom lens according to claim 1, wherein the rear lens group includes, in order from the object side to the image side, a third lens unit having positive refractive power and a fourth lens unit having positive refractive power.

12. The zoom lens according to claim 1, wherein the rear lens group includes, in order from the object side to the image side, a third lens unit having positive refractive power, a fourth lens unit having negative refractive power, and a fifth lens unit having positive refractive power.

13. The zoom lens according to claim 1, wherein the rear lens group includes, in order from the object side to the image side, a third lens unit having negative refractive power, a fourth lens unit having positive refractive power, a fifth lens unit having negative refractive power, and a sixth lens unit having positive refractive power.

14. An image pickup apparatus comprising:
a zoom lens; and
an image sensor configured to receive an image formed by the zoom lens,
wherein the zoom lens includes, in order from an object side to an image side, a first lens unit having positive refractive power, a second lens unit having negative refractive power, a reflecting unit for bending an optical path, and a rear lens group having two or more lens units, and the first lens unit and second lens unit are moved and the reflecting unit is not moved during zooming, wherein, during zooming, the first lens unit and the second lens unit are moved and the reflecting unit is not moved, and wherein the following conditions are satisfied:

$0.42 < (d2w - X1)/DR < 1.00$ $0.50 < |X1|/d2w < 5.00$ $0.36 < |f2|/d2w < 3.00$, where X1 is an amount of movement of the first lens unit during zooming from a wide-angle end to a telephoto end, DR is a distance from a reflection surface of the reflecting unit to an image plane on an optical axis, d2w is a distance on the optical axis from a lens surface of the second lens unit closest to the image side to the reflection surface of the reflecting unit at the wide-angle end, and f2 is a focal length of the second lens unit.

* * * * *